US008983774B2

(12) United States Patent
Gao et al.

(10) Patent No.: US 8,983,774 B2
(45) Date of Patent: Mar. 17, 2015

(54) INTELLIGENT MAP COMBINATION FOR VENUES ENABLING INDOOR POSITIONING

(71) Applicant: QUALCOMM Incorporated, San Diego, CA (US)

(72) Inventors: Weihua Gao, San Jose, CA (US); Sundar Raman, Fremont, CA (US); Sai Pradeep Venkatraman, Santa Clara, CA (US); Ju-Yong Do, Palo Alto, CA (US); Amir A. Emadzadeh, Campbell, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/938,124

(22) Filed: Jul. 9, 2013

(65) Prior Publication Data

US 2015/0019121 A1    Jan. 15, 2015

(51) Int. Cl.
*G06T 3/00*     (2006.01)
*G01C 21/00*    (2006.01)
*H04W 4/02*     (2009.01)

(52) U.S. Cl.
CPC .............. *G06T 3/0012* (2013.01); *G01C 21/00* (2013.01); *H04W 4/025* (2013.01)
USPC ....... 701/450; 701/446; 701/448; 340/539.13

(58) Field of Classification Search
None
See application file for complete search history.

(56) References Cited

U.S. PATENT DOCUMENTS

| | | | |
|---|---|---|---|
| 5,546,107 A | 8/1996 | Deretsky et al. | |
| 6,564,224 B1 | 5/2003 | Wu et al. | |
| 6,580,964 B2 * | 6/2003 | Sutherland et al. | 700/193 |
| 7,516,041 B2 * | 4/2009 | Smartt et al. | 702/167 |
| 7,565,241 B2 * | 7/2009 | Tauchi | 701/446 |
| 7,567,703 B2 | 7/2009 | Jones et al. | |

(Continued)

FOREIGN PATENT DOCUMENTS

| | | |
|---|---|---|
| WO | 2005050135 A1 | 6/2005 |
| WO | WO-2009083033 A1 | 7/2009 |

OTHER PUBLICATIONS

Birgit Elias et al., "Pedestrian Navigation—Creating a tailored geodatabase for routing", 4th Workshop on Positioning Navigation and Communication 2007, Mar. 1, 2007, pp. 41-47.

(Continued)

*Primary Examiner* — Thomas Tarcza
*Assistant Examiner* — Richard Goldman
(74) *Attorney, Agent, or Firm* — Kilpatrick Townsend & Stockton LLP

(57) ABSTRACT

Methods and devices are described for merging maps. In one potential embodiment a method may comprise receiving an indication of at least one plurality of geographically proximate points, where each of the at least one plurality of geographically proximate points are determined by at least one access point in communication with one or more mobile devices. A first and second map may then be received, where the first map and the second map each cover a first area such that the first area is in both the first map and the second map. The first map and the second map may then be merged by matching a mapping of a first portion of an indication of the at least one plurality of geographically proximate points on the first map and a second portion of an indication of an at least one plurality of geographically proximate points on the second map.

31 Claims, 11 Drawing Sheets

(56) References Cited

U.S. PATENT DOCUMENTS

| | | | |
|---|---|---|---|
| 7,860,649 B2 * | 12/2010 | Kanamori | 701/412 |
| 8,200,431 B2 * | 6/2012 | Lin | 701/533 |
| 8,279,119 B2 * | 10/2012 | Elwell et al. | 342/453 |
| 8,306,733 B2 * | 11/2012 | Shikimachi | 701/408 |
| 8,315,798 B2 * | 11/2012 | Shikimachi et al. | 701/450 |
| 8,320,939 B1 | 11/2012 | Vincent | |
| 8,359,156 B2 * | 1/2013 | Guo et al. | 701/411 |
| 8,504,288 B2 * | 8/2013 | Kadous et al. | 701/433 |
| 8,583,366 B2 * | 11/2013 | Iida | 701/450 |
| 8,594,928 B2 * | 11/2013 | Kida et al. | 701/446 |
| 8,644,275 B2 * | 2/2014 | Baier | 370/338 |
| 8,818,706 B1 * | 8/2014 | Ogale et al. | 701/409 |
| 8,831,627 B2 * | 9/2014 | Aninye et al. | 455/456.1 |
| 8,866,819 B2 * | 10/2014 | Dunko et al. | 345/442 |
| 2003/0158659 A1 * | 8/2003 | Tompkins et al. | 701/209 |
| 2007/0021908 A1 * | 1/2007 | Jaugilas et al. | 701/208 |
| 2007/0129892 A1 * | 6/2007 | Smartt et al. | 702/5 |
| 2008/0009965 A1 * | 1/2008 | Bruemmer et al. | 700/245 |
| 2008/0059062 A1 * | 3/2008 | Kanamori | 701/209 |
| 2008/0306689 A1 * | 12/2008 | Kourogi et al. | 701/217 |
| 2009/0005972 A1 * | 1/2009 | de Koning | 701/208 |
| 2009/0070035 A1 * | 3/2009 | Van Buer | 701/210 |
| 2009/0228212 A1 * | 9/2009 | Smartt et al. | 702/5 |
| 2009/0231360 A1 | 9/2009 | Orsak | |
| 2010/0057356 A1 * | 3/2010 | Lin | 701/209 |
| 2010/0125409 A1 * | 5/2010 | Prehofer | 701/207 |
| 2010/0250124 A1 * | 9/2010 | Shikimachi | 701/208 |
| 2010/0272085 A1 * | 10/2010 | Baier | 370/338 |
| 2010/0299370 A1 | 11/2010 | Otto | |
| 2011/0121963 A1 * | 5/2011 | Prehofer | 340/539.13 |
| 2011/0172913 A1 * | 7/2011 | Nakamura et al. | 701/208 |
| 2012/0195491 A1 * | 8/2012 | Zhang et al. | 382/153 |
| 2012/0290254 A1 * | 11/2012 | Thrun et al. | 702/150 |
| 2013/0030690 A1 * | 1/2013 | Witmer | 701/409 |
| 2013/0131979 A1 * | 5/2013 | Kida et al. | 701/446 |
| 2013/0137462 A1 * | 5/2013 | Van Os et al. | 455/456.3 |
| 2013/0172010 A1 * | 7/2013 | Kang et al. | 455/456.1 |
| 2013/0265312 A1 * | 10/2013 | Dunko et al. | 345/440 |
| 2013/0293377 A1 * | 11/2013 | Mohandes | 340/539.13 |
| 2014/0099973 A1 * | 4/2014 | Cecchini et al. | 455/456.3 |
| 2014/0149032 A1 * | 5/2014 | Barrett et al. | 701/409 |
| 2014/0172293 A1 * | 6/2014 | Chang et al. | 701/446 |
| 2014/0278060 A1 * | 9/2014 | Kordari et al. | 701/422 |
| 2014/0309925 A1 * | 10/2014 | Morato et al. | 701/412 |

OTHER PUBLICATIONS

International Search Report and Written Opinion—PCT/US2014/044936—ISA/EPO—Nov. 11, 2014.

* cited by examiner

INTELLIGENT MAP COMBINATION FOR VENUES ENABLING INDOOR POSITIONING

FIELD

Aspects of the disclosure relate to networked computing technologies and location services. In particular, aspects of the disclosure relate to systems, methods, apparatus, and computer readable media for merging maps information from multiple sources using information from mobile devices as anchors for maps to be merged.

BACKGROUND

As location services become more prevalent, mobile devices which are using location services may have access to map information from multiple different sources. Such map information may include different levels of details. Current methods of merging maps involve extracting features from the map information contained in the maps, and using those feature points and landmarks as anchors to align and scale different maps in order to match the anchor points and then merge the map information into a single merged map. If different maps are known to have the same coordinate systems, such as when maps include map location details in absolute latitude and longitude coordinates, then scaling and aligning is easy, simply using the coordinate details included in the map information.

In certain environments, merging information from different maps may be difficult because of differing orientation and scaling between the maps that makes identifying matching map points difficult if only the map information is used. Such a situation may be present with a detailed indoor map that may be available in certain environments, and an outdoor map without such indoor details. Improved systems and methods for merging maps in a mobile device location environment may thus be desirable.

BRIEF SUMMARY

Various embodiments are described herein related to systems, methods, apparatus, and computer readable media for merging maps using anchors derived from mobile device location information such as mobile device trajectory information or crowdsourced information from many mobile devices.

One potential embodiment is a method comprising receiving, at a computing device, an indication of at least one plurality of geographically proximate points, wherein each of the at least one plurality of geographically proximate points are determined by at least one access point in communication with one or more mobile devices; receiving a first map; receiving a second map, wherein the first map and the second map each cover a first area such that the first area is in both the first map and the second map, and wherein the indication of the at least one plurality of geographically proximate points is located within the first area; mapping at least a first portion of the indication of the at least one plurality of geographically proximate points on the first map; mapping at least a second portion of the indication of the at least one plurality of geographically proximate points on the second map; and merging the first map and the second map by matching the mapping of the first portion of the indication of the at least one plurality of geographically proximate points on the first map and the second portion of the indication of the at least one plurality of geographically proximate points on the second map.

One potential embodiment is a method of combining maps comprising: receiving, at a computing device, an indication of at least one plurality of geographically proximate points, wherein each of the at least one plurality of geographically proximate points are determined by at least one access point in communication with one or more mobile devices; receiving a first map; receiving a second map, wherein the first map and the second map each cover a first area such that the first area is in both the first map and the second map, and wherein the indication of the at least one plurality of geographically proximate points is located within the first area; mapping at least a first portion of the indication of the at least one plurality of geographically proximate points on the first map; mapping at least a second portion of the indication of the at least one plurality of geographically proximate points on the second map; and merging the first map and the second map by matching the mapping of the first portion of the indication of the at least one plurality of geographically proximate points on the first map and the second portion of the indication of the at least one plurality of geographically proximate points on the second map.

Additional embodiments of such a method may function where the first portion and the second portion of the indication of the plurality of geographically proximate points comprises at least one vector. Additional embodiments of such a method may function where mapping at least the first portion of the indication of the at least one plurality of geographically proximate points on the first map comprises mapping the at least one vector on the first map; where mapping at least the second portion of the indication of the at least one plurality of geographically proximate points on the second map comprises mapping the at least one vector on the second map; and where merging the first map and the second map by matching the mapping of the first portion of the indication of the at least one plurality of geographically proximate points on the first map and the second portion of the indication of the at least one plurality of geographically proximate points on the second map comprises: orienting the first map to match a first direction of the at least one vector as mapped on the first map to a second direction of the at least one vector as mapped on the second map; and scaling the first map to match a first magnitude of the at least one vector as mapped on the first map to match a second magnitude of the at least one vector as mapped on the second map.

Additional embodiments of such a method may function where wherein the at least one vector is derived from one of the at least one plurality of geographically proximate points. Additional embodiments of such a method may function where the at least one plurality of geographically proximate points are recorded at contiguous times. Additional embodiments of such a method may function where the indication of the at least one plurality of geographically proximate points is based upon information received from a plurality of mobile devices. Additional embodiments of such a method may function where the indication of the at least one plurality of geographically proximate points comprises an exit.

Additional embodiments of such a method may function where the indication of at least one plurality of geographically proximate points comprises an indication of at least three pluralities of geographically proximate points. Additional embodiments of such a method may function where the first portion of the indication of the at least one plurality of geographically proximate points comprises a first plurality of geographically proximate points, wherein the second portion of the indication of the at least one plurality of geographically proximate points comprises a second plurality of geographically proximate points, and wherein the first plurality and the second plurality of geographically proximate points are mutually exclusive portions of the indication of the at least one plurality of geographically proximate points.

Additional embodiments of such a method may function where the first plurality of geographically proximate points is based upon information from a first plurality of mobile devices and wherein the second plurality of geographically proximate points is based upon information from a second plurality of mobile devices that is different from the first plurality of mobile devices.

Additional embodiments of such a method may function where merging the first map and the second map by matching the mapping of the first portion of the indication of the at least one plurality of geographically proximate points on the first map and the second portion of the indication of the at least one plurality of geographically proximate points on the second map comprises: identifying a first pattern associated with the first plurality of geographically proximate points; identifying a second pattern associated with the second plurality of geographically proximate points; identifying a pattern match between the first pattern and the second pattern; orienting the first map and the second map to match a first direction of the first pattern as mapped onto the first map with a second direction of the second pattern as mapped onto the second map; and scaling the first map and the second map to match a first size of the first pattern as mapped onto the first map with a second size of the second pattern as mapped onto the second map.

Additional embodiments of such a method may function where identifying the first pattern associated with the first plurality of geographically proximate points comprises identifying at least a first map point, a second map point, and a third map point from the first plurality of geographically proximate points; wherein identifying the second pattern associated with the second plurality of geographically proximate points comprises identifying at least the first map point, the second map point, and the third map point from the second plurality of geographically proximate points.

Additional embodiments of such a method may function where the first pattern is associated with a turn. Additional embodiments of such a method may function where receiving the indication of the at least one plurality of geographically proximate points comprises receiving, from a crowdsourcing server computer, at least two map points derived from the at least one plurality of geographically proximate points, wherein the crowdsourcing server computer derives the at least two map points from information received from a plurality of mobile devices via the at least one access point.

Additional embodiments of such a method may function where receiving the indication of the at least one plurality of geographically proximate points comprises receiving, from a crowdsourcing server computer, at least one vector derived from the at least one plurality of geographically proximate points, wherein the crowdsourcing server computer derives the at least one vector from information received from a plurality of mobile devices via the at least one access point.

Another potential embodiment may be a computing device comprising: a wireless transceiver; a memory coupled to the wireless transceiver, the memory comprising a first map and a second map wherein the first map and the second map each cover a first area such that the first area is in the first map and the second map, and wherein the indication of the at least one plurality of geographically proximate points is located within the first area; and a processor coupled to the memory and the wireless transceiver, wherein the processor: receives, an indication of at least one plurality of geographically proximate points, wherein each of the at least one plurality of geographically proximate points are determined by at least one access point; maps at least a first portion of the indication of the at least one plurality of geographically proximate points on the first map; maps at least a second portion of the indication of the at least one plurality of geographically proximate points on the second map; and merges the first map and the second map to create a merged map by matching the mapping of the first portion of the indication of the at least one plurality of geographically proximate points on the first map and the second portion of the indication of the at least one plurality of geographically proximate points on the second map.

Additional embodiments of such a computing device may further include a location module coupled to the processor that determines a current location of the computing device; and an output display coupled to the processor, wherein the output display receives the merged map from the processor and presents the merged map via the output display along with the current location of the computing device.

Additional embodiments of such a computing device may function where the computing device is a mobile phone; and where the at least one plurality of geographically proximate points is determined using the location module of the mobile phone. Another potential embodiment may be a computing device comprising: means for receiving an indication of at least one plurality of geographically proximate points, wherein each of the at least one plurality of geographically proximate points are determined by at least one access point in communication with one or more mobile devices; means for receiving a first map; means for receiving a second map, wherein the first map and the second map each cover a first area such that the first area is in the first map and the second map, and wherein the indication of the at least one plurality of geographically proximate points is located within the first area; means for mapping at least a first portion of the indication of the at least one plurality of geographically proximate points on the first map; means for mapping at least a second portion of the indication of the at least one plurality of geographically proximate points on the second map; and means for merging the first map and the second map by matching the mapping of the first portion of the indication of the at least one plurality of geographically proximate points on the first map and the second portion of the indication of the at least one plurality of geographically proximate points on the second map.

Another embodiment of such a computing device may function where the first portion and the second portion of the indication of the plurality of geographically proximate points comprises at least one vector; and where the means for merging the first map and the second map comprises means for rotating and scaling the first map to match the at least one vector as mapped to the first map with the at least one vector as mapped to the second map.

Another such computing device may function where the indication of the at least one plurality of geographically proximate points is based upon information received from at least three mobile devices; and where the information received from each mobile device of the at least three mobile devices comprises at least one vector within the first area.

Another alternative potential embodiment may be a non-transitory computer readable storage medium comprising computer readable instructions that, when executed by a processor coupled to the storage medium cause a device to: receive an indication of at least one plurality of geographically proximate points, wherein each of the at least one plurality of geographically proximate points are determined by at least one access point in communication with one or more mobile devices; receive a first map; receive a second map, wherein the first map and the second map each cover a first area such that the first area is in the first map and the second map, and wherein the indication of the at least one plurality of geographically proximate points is located within the first area; map at least a first portion of the indication of the at least one plurality of geographically proximate points on the first map; map at least a second portion of the indication of the at least one plurality of geographically proximate points on the second map; and merge the first map and the second map by matching the mapping of the first portion of the indication of the at least one plurality of geographically proximate points on the first map and the second portion of the indication of the at least one plurality of geographically proximate points on the second map.

Another embodiment of such a non-transitory computer readable storage medium may function where mapping at least the first portion of the indication of the at least one plurality of geographically proximate points on the first map comprises causing the device to: determine a location of the at least one access point within a first coordinate system of the first map; determine a location of the at least one plurality of geographically proximate points with respect to the at least one access point; and determine the location of the at least one plurality of geographically proximate points within the first coordinate system of the first map using the location of the at least one plurality of geographically proximate points with respect to the at least one access point.

Another embodiment of such a non-transitory computer readable storage medium may function where mapping at least the first portion of the indication of the at least one plurality of geographically proximate points on the first map comprises causing the device to: select the at least one plurality of geographically proximate points on the first map from multiple pluralities of geographically proximate points based on a pattern associated with the at least one plurality of geographically proximate points; and wherein the merging the first map and the second map is performed using the pattern associated with the at least one plurality of geographically proximate points.

While various specific embodiments are described, a person of ordinary skill in the art will understand that elements, steps, and components of the various embodiments may be arranged in alternative structures while remaining within the scope of the description. Also, additional embodiments will be apparent given the description herein, and thus the description is not referring only to the specifically described embodiments, but to any embodiment consistent with the functions and structures described herein.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
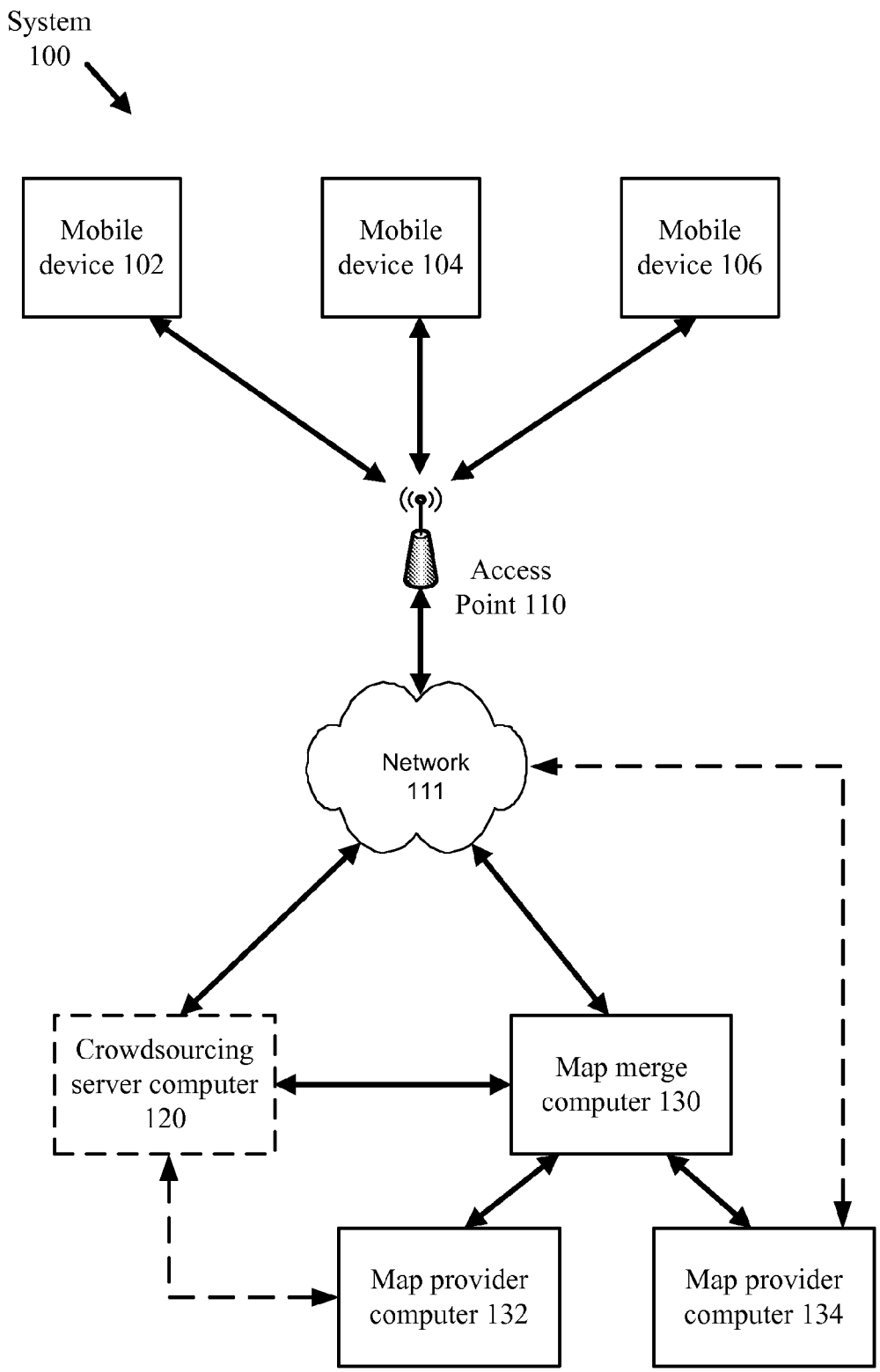
FIG. 1 is a system diagram for one potential embodiment.

Embodiments disclosed herein relate to systems for providing location services. Such services may include providing map information to users via mobile devices. Such map information may include merged maps derived from multiple sources using a process where anchors from access point assisted mobile device location measurements are used to create merged maps. This may be especially useful in indoor locations where detailed map information for an interior location may be provided separately from outside map information, or where multiple interior locations may be connected by a passage, but have detailed map information provided by separate sources. Such merged maps may provide increased amounts of information to a user in conjunction with location and direction services.

In particular, indoor environments in which wireless communication structures not associated with the indoor location may be blocked or have low signal strength may benefit from embodiments that merge maps. Because mapping systems which collect information external to the location using public space may not have access to the interior to collect map information, maps created for the indoor environment may benefit from systems that are able to merge this indoor map information with broader external maps.

Deployment of network based positioning systems is creating new possibilities for analyzing user location and using that location for a variety of purposes, including improving the quality and accuracy of maps. In certain environments, for example, maps from different sources could have different level of details. Sometimes, some map providers can only provide a detailed map for a certain area. In a shopping mall environment, a map for a particular large shop may provide a very detailed map, but smaller shops and general public areas may only have simple maps with little detail. Further, multiple different maps with differing level of detail may be completely separate, without an inherent indication or easy way for a system to match the maps together. How to combine the maps from different sources has an additional problem when each map is in its coordinate frame, with different scales and different orientations. Maps from some providers may have better accuracy, but there is also an issue when aggregating maps of how to judge the quality of different maps and detect the errors on the maps. Embodiments described herein may function where location points for one or more users and/or trajectories for location points from the users may be used to intelligently combine maps as part of a positioning system, and to verify and/or improve the contents of the map.

In particular, in such a mall environment with many stores, a mall management company may be a first map information source that provides a first map including road, parking, and general information for external walls of stores, with no details relating to the interior of any specific stores. A large department store within the mall may function as a second map information source that may include a second map that only includes specific details for the department store. These two separate maps may have different scales, orientations, and may even include conflicting information. The first map may simply show the department store as a large rectangle, while the second may show a more complex and accurate external wall structure that is roughly but not exactly rectangular, along with specific internal details of the department store such as interior walls, product placement, registers, exits, elevators, multi-level floor plans, and other such details.

A mobile device using location services in such an environment may communicate with access points or other resources that may determine a position of the mobile device within a map. Because the two maps may have different natural orientations and scales, single position measurements from a single device may be insufficient to accurately merge the information from the two maps. Instead, more complex location information from one or more mobile devices may be used to anchor the two maps in such a way that provides sufficient information for the anchor to be used to accurately orient and scale the two maps to create a merged map. For example, vector information describing movement of one or more mobile devices may provide information sufficient to both orient and scale the different maps. Alternatively, crowdsourced positioning data may be used to identify patterns of movement or map points which may then be used to accurately merge the different maps.

In various embodiments, a number of maps and map sources may be used such that two, three, four, or more different maps may be merged into a single merged maps. Further systems and methods for merging maps may combine different techniques for merging maps using location information for mobile devices positioned within maps as well as map points identified either within the maps as originally received or as identified using crowdsourced information from different mobile devices. Thus, a first and second map may be merged using a first technique, and a third map may be merged with the first and second map using a second technique. Any number of maps may be merged at the same time or serially to create a merged map.

FIG. 1 describes a system 100 which may be used to implement various embodiments. System 100 as shown includes mobile devices 102, 104, 106, access point 110, network 111, crowdsourcing server computer 120, map merge computer 130, and map provider computers 132 and 134.

Such a system includes at least one mobile device. System 100 includes a plurality of mobile devices shown as mobile device 102, mobile device 104, and mobile device 106. Mobile devices may be mobile telephones, "smartphones", specialized electronic computing devices dedicated to providing map, direction, and location services, laptop computers, or other such computing devices. One potential embodiment may be the mobile device illustrated in detail in FIG. 4. Other embodiments may be implemented according to the details illustrated in FIG. 9.

Mobile devices access network 111 via access point 110. An access point (AP) may refer to any transmission point that communicates with a nearby mobile device according to any number of IEEE standards (for example one or more of the 802.11 standards) or using Bluetooth or other short range wireless technologies. It may be appreciated that while many of the embodiments of the method described herein refer to wireless access point and use of IEEE 802.11 positioning procedures, the method may be equally applicable to other types of electronic communications such as Bluetooth. In alternative embodiments, cellular telephone communications or other communications standards may be enabled by other devices such as Femto cells, Bluetooth transceivers, or any other such devices for enabling mobile access to a network.

Network 111 may be a local area network that connects local computing devices if the map and map provider computers are locally positioned, or may include both local area networks, wide area networks, and the Internet in order to enable a map merge computer 130 that is remotely located to provide merged maps to a mobile device.

Crowdsourcing server computer 120 may comprise a database of location measurements from large numbers of users of a location service for a local area. Such a database in a crowdsourcing server computer 120 may be created by a location service that includes crowdsourcing server computer 120, or may be aggregated from multiple sources. While crowdsourcing server computer 120 is shown as a separate computer in FIG. 1, in various embodiments, it may be integrated with map merge computer 130, map provider computer 132, or may be optional if a system is merging maps without crowdsourced data.

Map provider computers 132 and 134 may store map information and maps to provide to mobile devices. For example, as described above, one map provider computer may be created by a department store to provide maps to smartphone users who are in or near a department store location, and another map provider computer may be created by a company that manages a mall area. Just as with the crowdsourcing server computer 120, one of the map provider computers 132 or 134 may be integrated with map merge computer 130 or crowdsourcing server computer 120, with a second separate map provider computer communicatively coupled to provide separate map information to be merged according to various embodiments.

Map merge computer 130, then, functions to receive user location information or user trajectory information either directly from mobile devices 102, 104, and/or 106, or from a database within crowdsourcing server computer 120. This information may be received either directly from these sources, or may be received via the map provider computers along with map information. Map merge computer 130 then also receives map information from map provider computer 132 and map provider computer 134. This separate map information including a first map from map provider computer 132 and a second map from map provider computer 134 may then be merged by map merge computer 130, and provided to a mobile device from map merge computer 130.

Figure 2A:
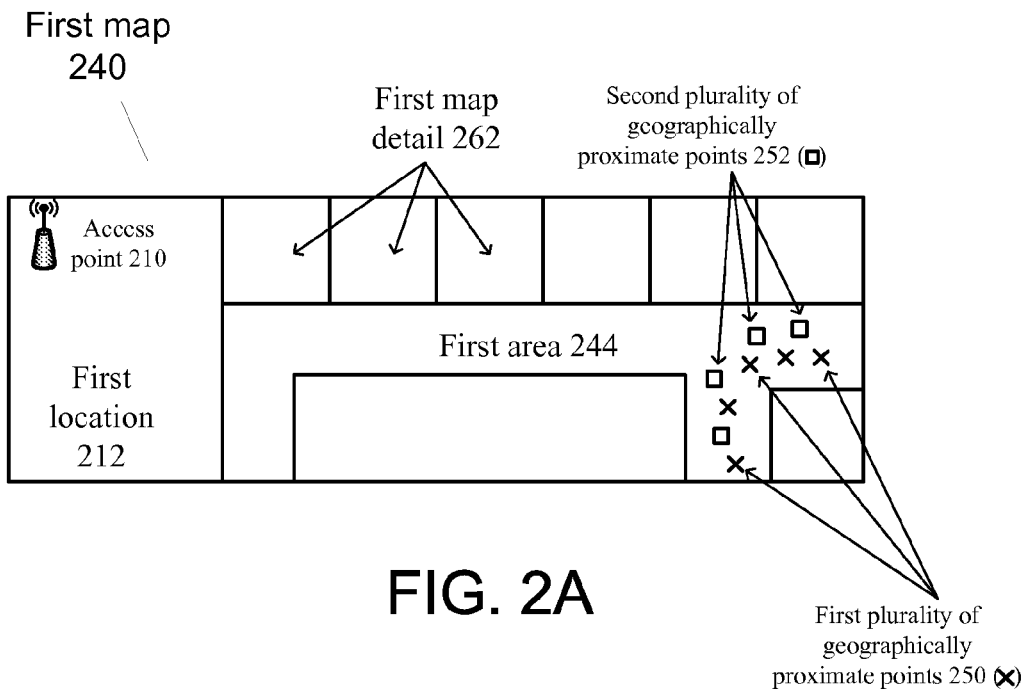
FIG. 2A illustrates a map according to one potential embodiment.
Figure 2B:
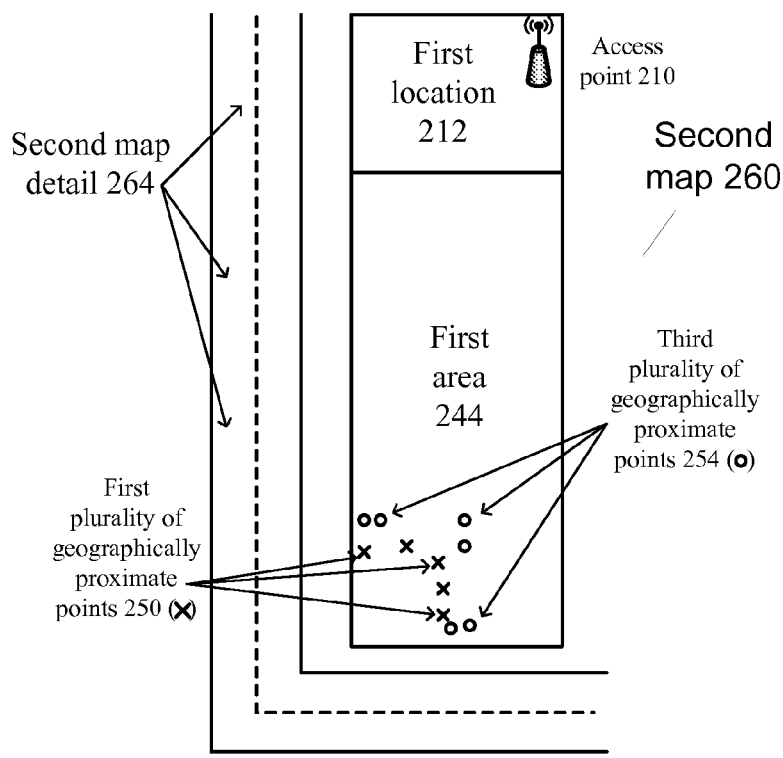
FIG. 2B illustrates a map according to one potential embodiment.
Figure 2C:
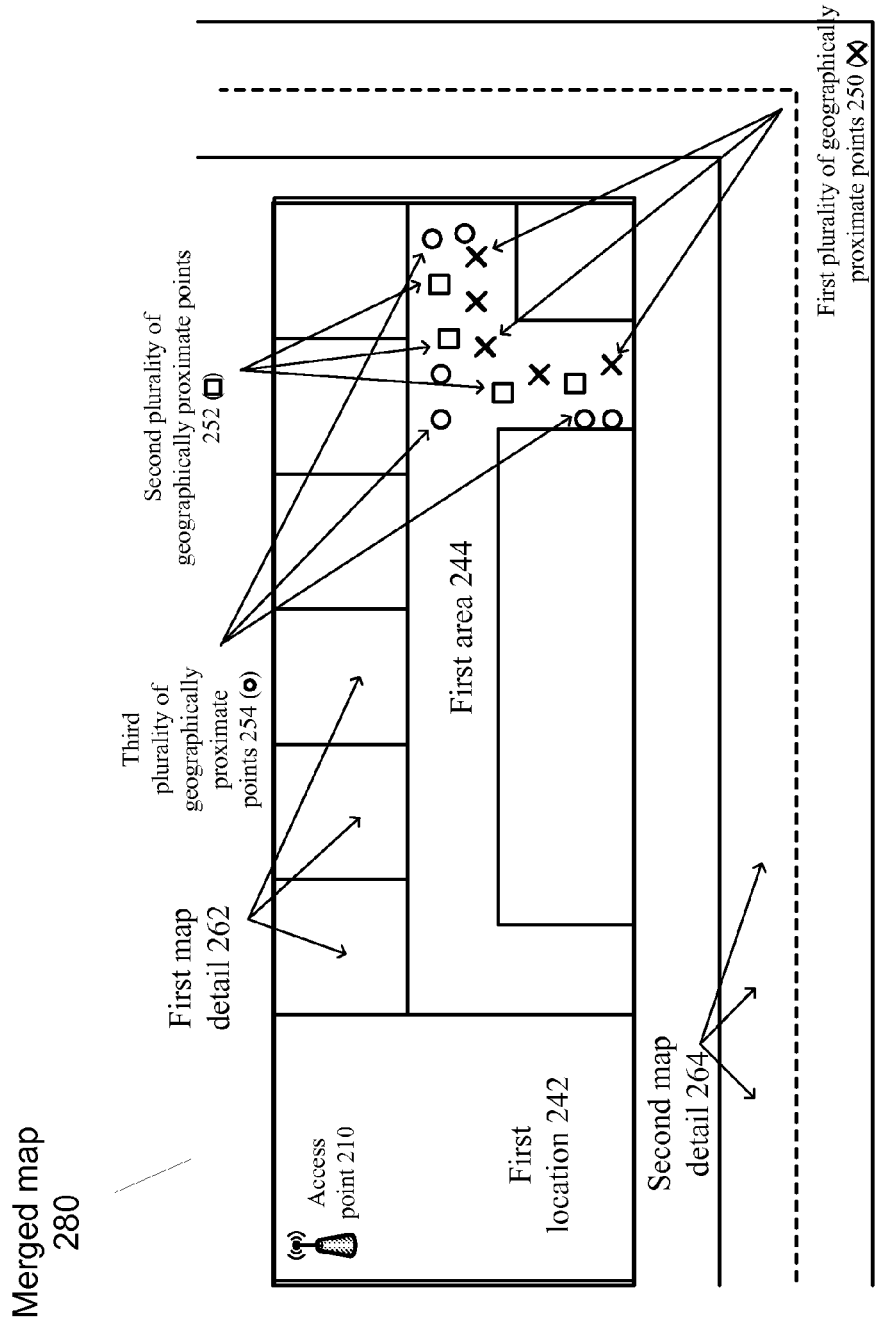
FIG. 2C illustrates a map according to one potential embodiment.

FIGS. 2A and 2B then illustrate maps that may be merged according to one potential embodiment with a merged map illustrated in FIG. 2C. FIG. 2A shows a first map 240. First map 240 may include map information such as a location of access point 210, a first location 212, a first area 244, first map detail 262, a first plurality of geographically proximate points 250, and a second plurality of geographically proximate points 252.

FIG. 2B includes second map 260. Second map 260 may include map information including a first location 212 from access point 210, second map detail 264, a first area 244, a first plurality of geographically proximate points 250, and a third plurality of geographically proximate points 254.

As shown in FIGS. 2A and 2B, while portions of information associated with first map 240 and second map 260 may be the same, portions of the map information are different. For example, at least first map detail 262 is different from second map detail 264, such that first map 240 and second map 260 include separate details that may be merged. At the same time, other map details may be the same, such as first location 212 and access point 210.

Similarly, while mobile device measurements shown as pluralities of geographically proximate points may be the same as identified within each map, as shown by the first plurality of geographically proximate points 250, methods may also function where some or all of the geographically proximate points identified within one map are different from geographically proximate points in another map, such that certain embodiments may function to merge maps even if only the second plurality of geographically proximate points 252 and the third plurality of geographically proximate points 254 are available.

Such geographically proximate points may be structured in a variety of ways. For example, in one potential embodiment, the first plurality of geographically proximate points 250 may represent location measurements and trajectories from a single mobile device over time as the mobile device moves through the first area. In other embodiments, the first plurality of geographically proximate points may represent location measurements or individual trajectories for many different devices. The specific grouping of a plurality of geographically proximate points may be used in different ways to merge maps, as describe in more detail in the embodiments of FIGS. 5 and 6.

In certain embodiments, each map to be merged includes at least one area that is the same, with location measurement points within this area that may be used as a portion of the anchor identification for each map to enable the maps to be merged. Groups of location measurements or trajectory measurements for mobile devices which are taken with at least a portion of the measurements in this shared area are considered geographically proximate points. As shown in FIGS. 2A and 2B, first map 240 and the second map 260 each cover the same first area 244 such that the first area 244 is in both the first map and the second map. Further, the pluralities of geographically proximate points 250, 252, and 254 are within this shared first area 244.

In one embodiment, the geographically proximate points may be identified by location measurements created in conjunction with access point 110, such as Time Difference of Arrival (TDOA), Round Trip Time (RTT), signal strength and signal to noise ratio measurements. For example, access point 110 may operate with a Secure User Plane Location (SUPL) system and supporting computers such as SUPL Location Platforms (SLP) to provide network based positioning. Examples of positioning protocols supported by SUPL include Radio Resource Location Services (LCS) Protocol (RRLP), Radio Resource Control (RRC), LTE Positioning Protocol (LPP), IS-801 and LPP Extensions (LPPe). Typically, LPPe may not be used in isolation but only to extend LPP such that an LPP positioning protocol message may contain an embedded LPPe message. Thus, whenever LPPe is used, LPP may also be used and the combined protocol may be referred to as LPP/LPPe. RRLP, RRC and LPP are defined by an organization known as the 3rd Generation Partnership Project (3GPP), IS-801 is defined by an organization known as the 3rd Generation Partnership Project 2 (3GPP2) and LPPe is defined by OMA, all in publicly available documents.

The terms location, location estimate, position and position estimate are used interchangeably herein and refer to a location of a mobile device which may be expressed in absolute terms (e.g. using latitude, longitude and possibly altitude coordinates), or in a civic form (e.g. as a postal address) or in relative terms (e.g. as a distance and direction from some other known location).

As part of the SUPL location systems mentioned above, a mobile device may measure signals from one or more access points by obtaining the MAC addresses of nearby access points, along with signal strength and possibly round trip time (RTT) to an access point. Another method may be for wireless access points to measure signals (e.g. IEEE 802.11 frames) transmitted by a mobile device. The signal measurements obtained by an access point or by a number of access points may then be used to determine the location of the mobile device based on a known location for each of the access points. The location determination may be performed by the access point or by a location server that is in communication with the one or more access points. The determined location may then be provided to the mobile device, the crowdsourcing server computer 120, or to the map provider computer 132 or 134. This specific method for identifying individual points has been described in the IEEE 802.11v standard for wireless access points.

Once the measurement for individual points have been taken, this information may be stored independently within a crowdsourcing server computer 120 in a database, or the information may be communicated as indications of geographically proximate points and integrated with one or more maps to identify one or more pluralities of geographically proximate points within the maps. In certain embodiments, for example where a first access point is used as a reference to identify a first plurality of geographically proximate points, and the location of the first access point is only known within the context of a first map but not within the context of a second map, that first plurality of geographically proximate points may only be available to be mapped for that first map, but not for the second map. This is illustrated with the second plurality of geographically proximate points 252 shown in first map 240 but not in second map 260. Other indications of geographically proximate points may have references identifiable in multiple maps, such as the first plurality of geographically proximate points 250 shown both in first map 240 and second map 260. Once the geographically proximate points are identified within an appropriate area and in specific point locations for maps to be merged, the points may be analyzed to identify matches that enable merging of the maps.

Such an analysis may identify anchors from the geographically proximate points that allow merging a first map and a second map by matching the mapping of at least a first portion of an indication of at least one plurality of geographically proximate points on the first map and a second portion of an indication of the at least one plurality of geographically proximate points on the second map. FIG. 2C shows first map detail 262 and second map detail 264 merged from first map 240 and second map 260 into merged map 280. Any other shared information from first map 240 and second map 260 may also be included in merged map 280. As shown in merged map 280, the first, second, and third pluralities of geographically proximate points 250, 252, and 254 are represented within merged map 280, since after the merger of first map 240 and second map 260 using the geographically proximate points, the correct location for all of the geographically proximate points used to merge the maps will be known in the correct location within merged map 280.

Figure 3:
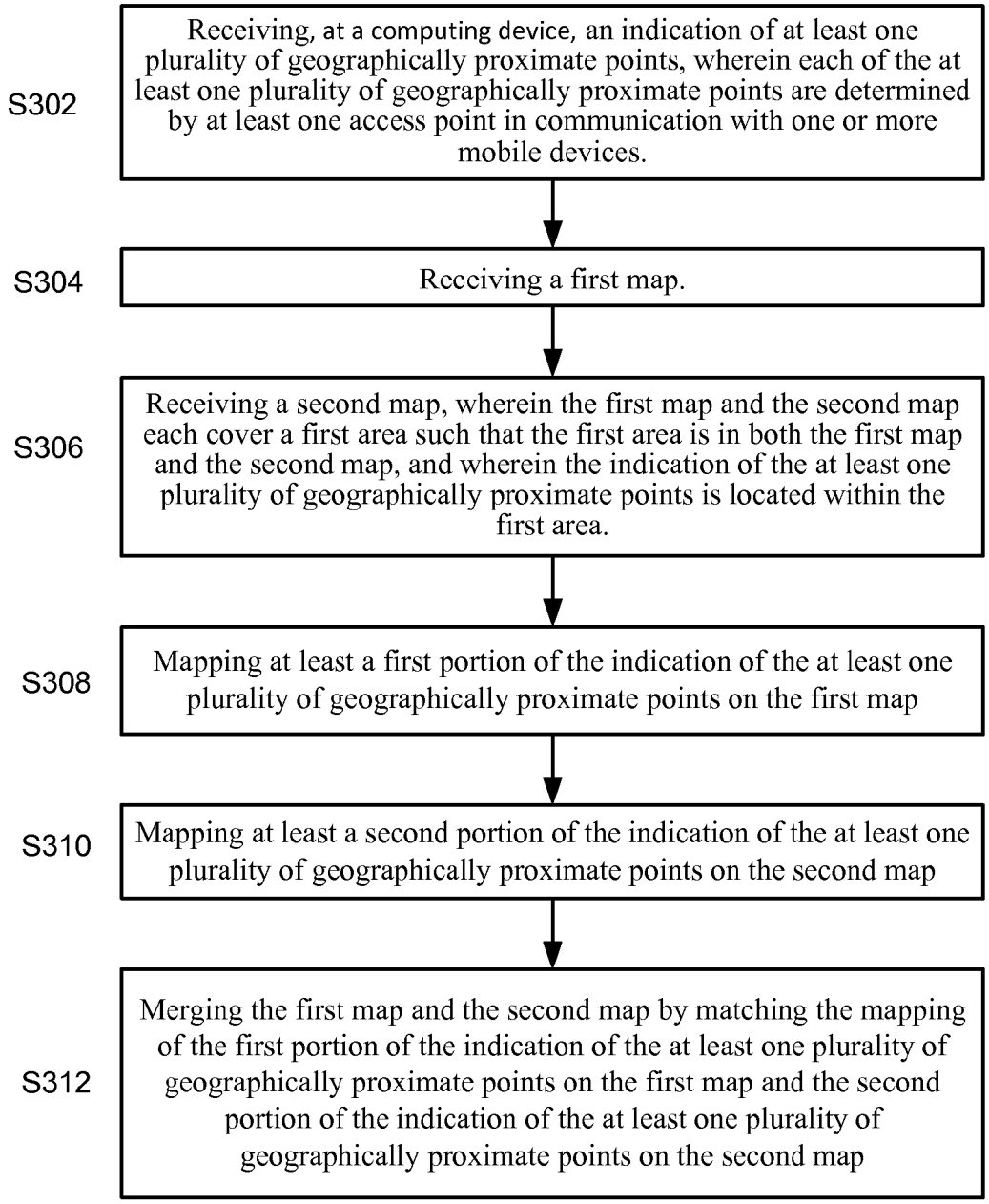
FIG. 3 describes a method according to one potential embodiment.

FIG. 3 then describes one potential example of a method for merging maps according to one potential embodiment. While aspects of the method of FIG. 3 are described with respect to FIG. 1, any alternative system or map described herein may be used according to the method described in FIG. 3. S302 involves receiving, at a computing device, an indication of at least one plurality of geographically proximate points, wherein each of the at least one plurality of geographically proximate points are determined by at least one access point in communication with one or more mobile devices. In various embodiments, such a computing device may either be a mobile device such as mobile device 102 receiving measurement data as an indication of at least one plurality of geographically proximate points, with the maps to be merged at mobile device 102 for display on mobile device 102. In alternate embodiments, the computing device may be map merge computer 130 receiving this information so that map merge computer 130 may merge the maps and provide merged maps to mobile devices such as mobile device 102 for display on mobile device 102.

In S304, a first map is received. This may be received from map provider computer 132, or from any other location where map information may be stored in different embodiments. The first map may be, for example, map 240 of FIG. 2A. S306 involves receiving a second map, where the first map and the second map each cover a first area such that the first area is in both the first map and the second map, and wherein the indication of the at least one plurality of geographically proximate points is located within the first area. This may be received from map provider computer 134 which is separate from map provider computer 132, and may be a map such as second map 260 of FIG. 2B.

S308 involves mapping at least a first portion of the indication of the at least one plurality of geographically proximate points on the first map. Such a first portion of the indication of the at least one plurality of geographically proximate points may include, for example, any portion of the pluralities of geographically proximate points 250 or 252 mapped onto first map 240. Similarly, S310 involves mapping at least a second portion of the indication of the at least one plurality of geographically proximate points on the second map. Such a second portion of the indication of the at least one plurality of geographically proximate points may include any portion of the pluralities of geographically proximate points 250 or 254 mapped onto second map 260. These first and second portions may include the same set of points, or may be different sets of points, but each of the first and second portions comprises a plurality of points sufficient to provide anchoring information to merge the first and second maps.

S312 then involves merging the first map and the second map by matching the mapping of the first portion of the indication of the at least one plurality of geographically proximate points on the first map and the second portion of the indication of the at least one plurality of geographically proximate points on the second map. Such a matching may involve matching vectors identified from the first and second portions of points, or matching crowdsourced groupings of points as detailed further below. In either case, the indications of point measurements which are identified as the first, second, and third pluralities of geographically proximate points 250, 252, and 254 may thus be matched to orient and scale first map 240 and second map 260 into merged map 280.

FIG. 3 may then describe a particular embodiment of a mobile device 400. Mobile device 400 may be one potential implementation of such as mobile devices 102, 104, and 106 of FIG. 1. Mobile device 400 includes a processor 410, a memory 420, a local area network (LAN) wireless transceiver 442 coupled to link 446 via antenna 444, wide area network (WAN) wireless transceiver 412 coupled to link 416 via antenna 414, hardware modules 401, location module 430, display output 403, and user input module 404.

In certain embodiments, mobile device 400 may also include hardware, software, and/or firmware modules for implementing GNSS (global navigation satellite system) positioning. Such systems may include a transceiver and one or more antennas to determine a device position. In certain embodiments, GNSS modules may be implemented as part of hardware modules 401. In still further embodiments, positioning information received via a GNSS module may be used to supplement network based positioning information.

FIG. 3 now describes one potential implementation of a mobile device 400 according to certain embodiments. As described above, FIG. 1 illustrates a system which, in one embodiment, may merge maps at a map merge computer 130. In certain embodiments, however, as mentioned above, the merging may be performed at a mobile device 400 by a map merge application module 421. Such a module may receive first and second maps from different sources, such as first and second map provider computers 132 and 134. These maps may, for example, be sent to different applications 424 operating on mobile device 400 within memory. For example, a first application of applications 424 may include a first map such as first map 240, and a second application of applications 424 may include a second map such as second map 260. Indications of pluralities of geographically proximate points may be received by mobile device 400 either using a location module 430 that measures location and movement of mobile device 400, by using a crowdsourcing module 422 that stores a record of such indications from mobile device 400 or other mobile device, or via a network either from WAN wireless transceiver 412 or LAN wireless transceiver 442. Map merge application module 421 may then use the maps and the indications of geographically proximate points to merge the different maps as described in various embodiments.

Figure 4:
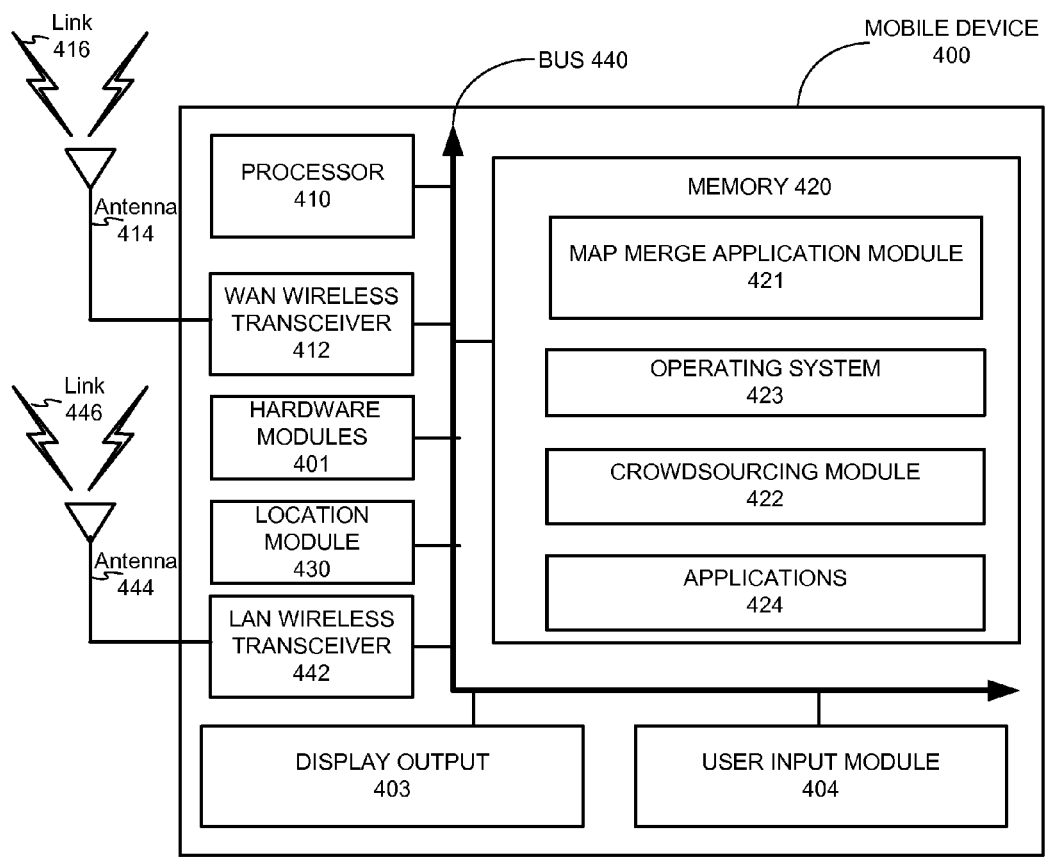
FIG. 4 is one potential example of a mobile device for use with a potential embodiment.

In the embodiment shown at FIG. 4, mobile device 400 includes processor 410 configured to execute instructions for performing operations at a number of components and can be, for example, a general-purpose processor or microprocessor suitable for implementation within a portable electronic device. Processor 410 is communicatively coupled with a plurality of components within mobile device 400. To realize this communicative coupling, processor 410 may communicate with the other illustrated components across a bus 440. Bus 440 can be any subsystem adapted to transfer data within mobile device 400. Bus 440 can be a plurality of computer buses and include additional circuitry to transfer data.

Memory 420 may be coupled to processor 410. In some embodiments, memory 420 offers both short-term and long-term storage and may in fact be divided into several units. Memory 420 may be volatile, such as static random access memory (SRAM) and/or dynamic random access memory (DRAM) and/or non-volatile, such as read-only memory (ROM), flash memory, and the like. Furthermore, memory 420 can include removable storage devices, such as secure digital (SD) cards. Thus, memory 420 provides storage of computer readable instructions, data structures, program modules, and other data for mobile device 400. In some embodiments, memory 420 may be distributed into different hardware modules.

In some embodiments, memory 320 stores a plurality of application modules 421, 422, and 424, which may be any number of applications. Application modules contain particular instructions to be executed by processor 410. In alternative embodiments, other hardware modules 401 may additionally execute certain applications or parts of applications. In certain embodiments, memory 420 may additionally include secure memory, which may include additional security controls to prevent copying or other unauthorized access to secure information such as private indications of geographic points related to movement of mobile device 400 that may be used for map merging by map merge application module 421

In some embodiments, memory 420 includes an operating system 423. Operating system 423 may be operable to initiate the execution of the instructions provided by application modules and/or manage other hardware modules 401 as well as interfaces with communication modules which may use WAN wireless transceiver 412 and LAN wireless transceiver 442. Operating system 423 may be adapted to perform other operations across the components of mobile device 400 including threading, resource management, data storage control and other similar functionality.

In some embodiments, mobile device 400 includes a plurality of other hardware modules 401. Each of other hardware modules 401 is a physical module within mobile device 400. However, while each of hardware modules 401 is permanently configured as a structure, a respective one of hardware modules 401 may be temporarily configured to perform specific functions or temporarily activated. A common example is an application module that may program a camera module (i.e., hardware module) for shutter release and image capture. A respective one of hardware modules 301 can be, for example, an accelerometer, a Wi-Fi transceiver, a satellite navigation system receiver (e.g., a GPS module), a pressure module, a temperature module, an audio output and/or input module (e.g., a microphone), a camera module, a proximity sensor, an alternate line service (ALS) module, a capacitive touch sensor, a near field communication (NFC) module, a Bluetooth transceiver, a cellular transceiver, a magnetometer, a gyroscope, an inertial sensor (e.g., a module the combines an accelerometer and a gyroscope), an ambient light sensor, a relative humidity sensor, or any other similar module operable to provide sensory output and/or receive sensory input. In some embodiments, one or more functions of the hardware modules 401 may be implemented in software.

In various embodiments, any of such hardware modules 401 may be used to create indications of geographic points for use in map merging as described herein. For example, an accelerometer and/or magnetometer may be used in conjunction with an initial access point location measurement to track movement away from the original location measured using a network measurement from an access point. This may enable mobile device 400 to create indications of geographically proximate points in an indoor location even if no network connection is available.

Mobile device 400 may include a component such as wireless communication module which may integrate antenna 414 and wireless transceiver 412 with any other hardware, firmware, or software necessary for wireless communications. Such a wireless communication module may be configured to receive signals from various devices such data sources via networks and access points. In addition to other hardware modules 401 and applications 424 in memory 420, mobile device 400 may have a display module 403 and a user input module 404. Display module 403 graphically presents information from mobile device 400 to the user. This information may be derived from one or more application modules 421, one or more hardware modules 401, a combination thereof, or any other suitable means for resolving graphical content for the user (e.g., by operating system 423). Display module 403 can be liquid crystal display (LCD) technology, light emitting polymer display (LPD) technology, or some other display technology. In some embodiments, display module 403 is a capacitive or resistive touch screen and may be sensitive to haptic and/or tactile contact with a user. In such embodiments, the display module 403 can comprise a multi-touch-sensitive display. Display output 403 may then be used to display a merged map that is created according to various embodiments. In certain embodiments, a first map may initially be display, and a second may also be displayed prior to a map merge. Map merge application module 421 may identify the presence of maps which may be merged, and prompt a user whether a map merge is desired. A merger of maps may then be performed after a user input to user input module 404, and the merged map displayed on display output 403 in response to a user input that initiated the merge and the display of the merged map.

Additional potential embodiments of a mobile device may further comprise various portions of computing devices as are detailed below with respect to FIG. 9 and networks as detailed in FIG. 10.

Figure 5A:
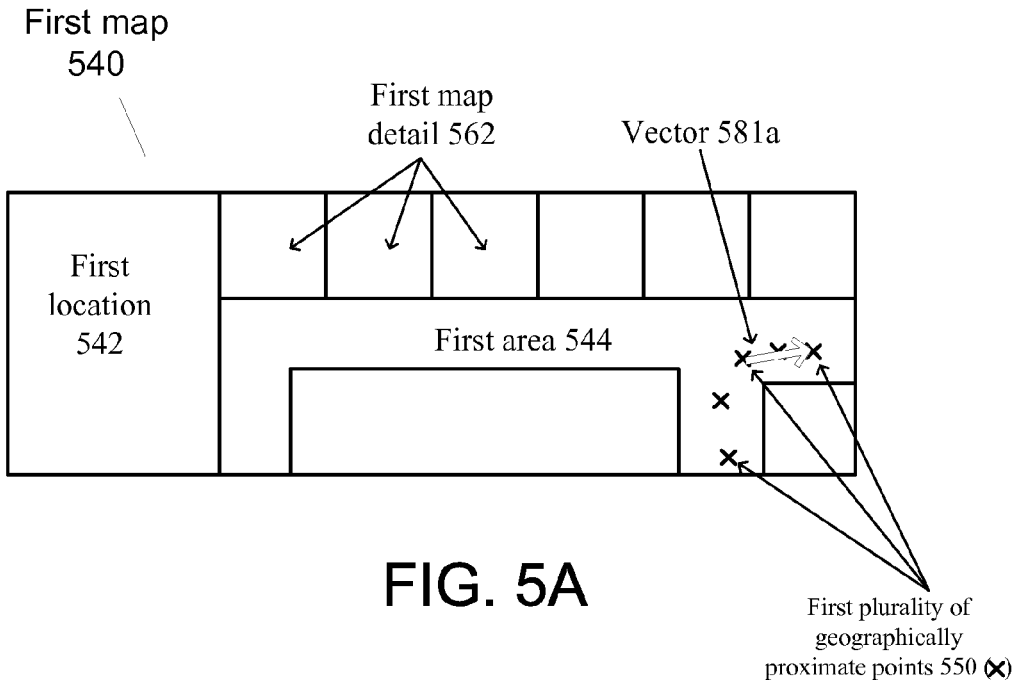
FIG. 5A illustrates a map according to one potential embodiment.
Figure 5B:
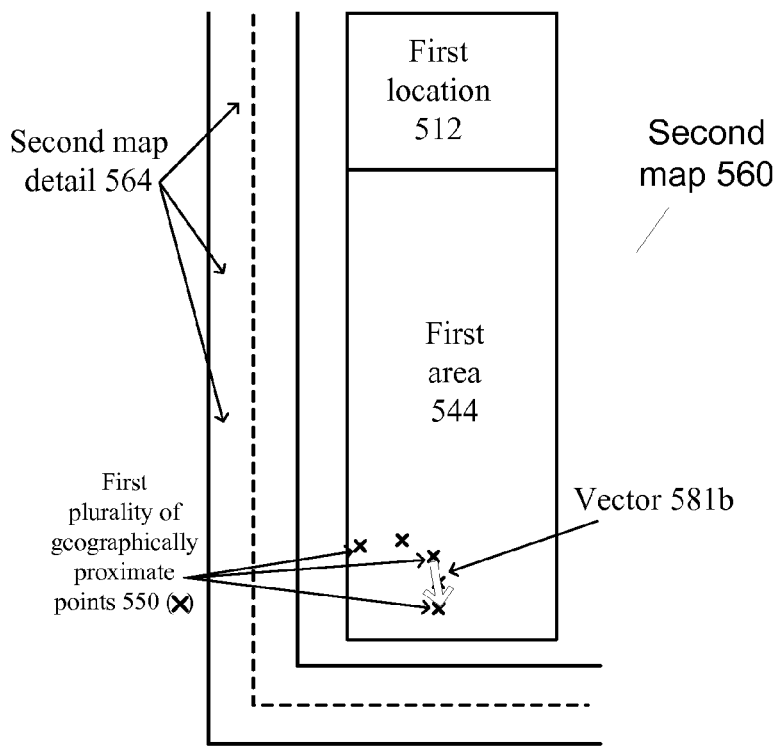
FIG. 5B illustrates a map according to one potential embodiment.

FIGS. 5A and 5B describes one potential alternative embodiment, in which trajectories may be identified from indications of a plurality of geographically proximate points, and vectors associated with the trajectories may be used as anchors for aligning and scaling maps in a map merge process. FIG. 5A includes first map 540, first location 542, first map detail 562, first area 544, and first plurality of geographically proximate points 550, just as in FIG. 2A. In FIG. 5A, however vector 581 is identified from the first plurality of geographically proximate points. Vector 581 may be identified from any number of methods, including a vector between two location measurements for a mobile device such as mobile device 400, a measured location point with a trajectory and speed measured by sensors within a mobile device, or any other such method of identifying vector 581. Similarly, while FIG. 5A shows a line vector, any other information describing a trajectory such as an arc, a line vector showing velocity and position over time, or any other such information that provides both a position and a scale that may be used to both orient and scale two different maps may be used as an anchor in place of vector 581 in different embodiments.

FIG. 5B includes second map 560 having second map detail 564, first location 512, first area 544, and first plurality of geographically proximate points 550. Because the same first plurality of geographically proximate points 550 within first area 544 is known within the relative location of second map 560 as well as first map 540, vector 581 may be determined for second map 560 as well as first map 540. In order to merge first map 540 and second map 560 after vector 581 is identified within the relative map position of both maps, one map may be fixed, and the other map may be transformed. For example, if the first map 540 is fixed, and the second map 560 is to be transformed, both first map 540 and second map 560 may first be placed within the coordinate system of the first map. The second map 560 may then be translated until one end of vector 581*b* matches the same end of vector 581*a*. The second map 560 may then be rotated to match the direction of vector 581*b* to the direction of vector 581*a*. Finally, the second map may be scaled until the magnitude of vector 581*b* matches the magnitude of vector 581*a*. This transformation of second map 560 with then match the scale and orientation of first map 540, and the information from both maps may be merged into a single merged map 280 with a single coordinate system that contains any desired information from both first map 540 and second map 560.

Figure 6:
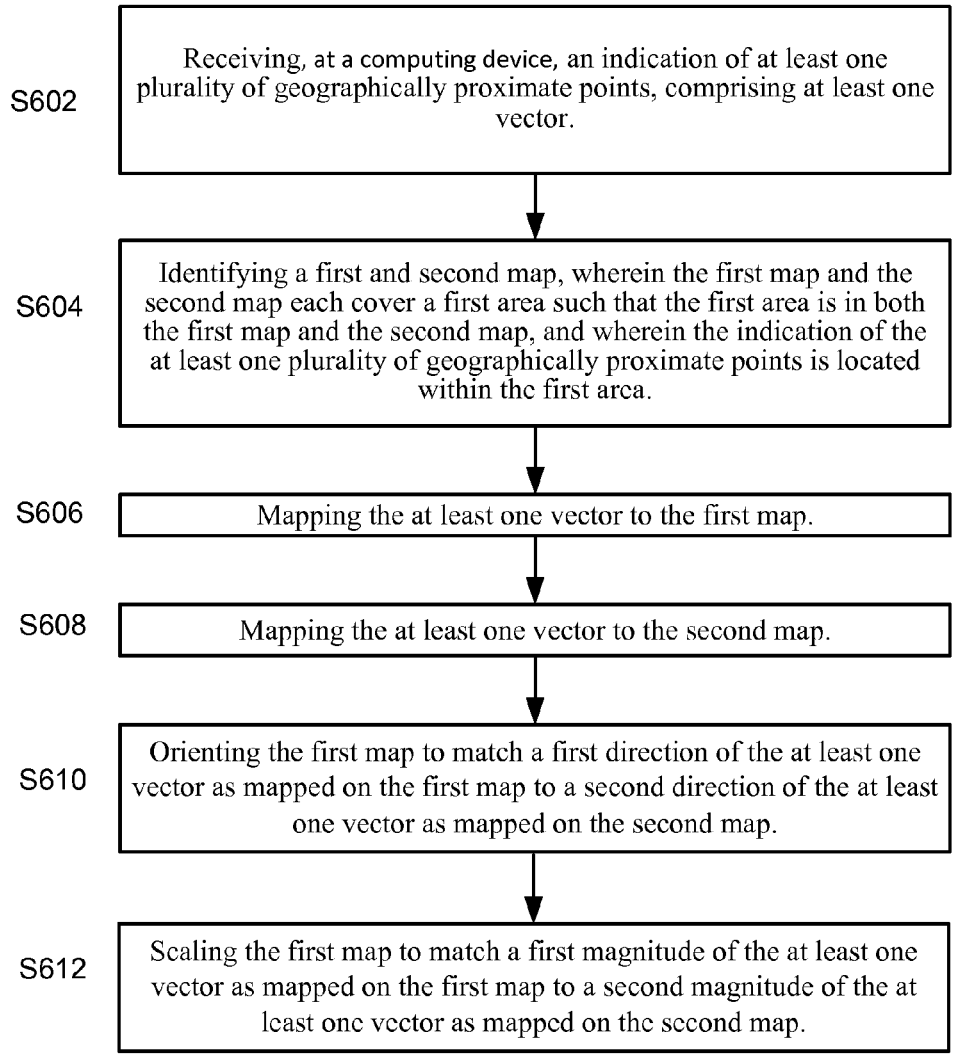
FIG. 6 illustrates a method according to one potential embodiment.

FIG. 6 then describes another potential method for merging maps according to one potential embodiment. S602 involves receiving, at a computing device, an indication of at least one plurality of geographically proximate points, comprising at least one vector. Just as described above, the computing device may be a server such as map merge computer 130, or the computing device may be a mobile device such as mobile device 102 or mobile device 400.

S604 involves identifying a first and second map, where the first map and the second map each cover a first area such that the first area is in both the first map and the second map, and wherein the indication of the at least one plurality of geographically proximate points is located within the first area. In one embodiment, this may include first map 540 and second map 560, each having first area 544, with the first plurality of geographically proximate points 550 inside of first area 544.

S606 then involves mapping the at least one vector, such as vector 581*a*, to the first map, such as first map 540. Similarly, S608 may involve mapping the at least one vector such as vector 581*b*, to the second map such as second map 560. S610 and S612 then involve transforming the maps to merge them. S610 involves orienting the first map to match a first direction of the at least one vector as mapped on the first map to a second direction of the at least one vector as mapped on the second map. S612 involves scaling the first map to match a first magnitude of the at least one vector as mapped on the first map to a second magnitude of the at least one vector as mapped on the second map. This then results in the maps having the same coordinates, such that they may be merged into a single map with a coordinate system for the merged map that was created by the orienting and scaling in S610 and S612.

Figure 7A:
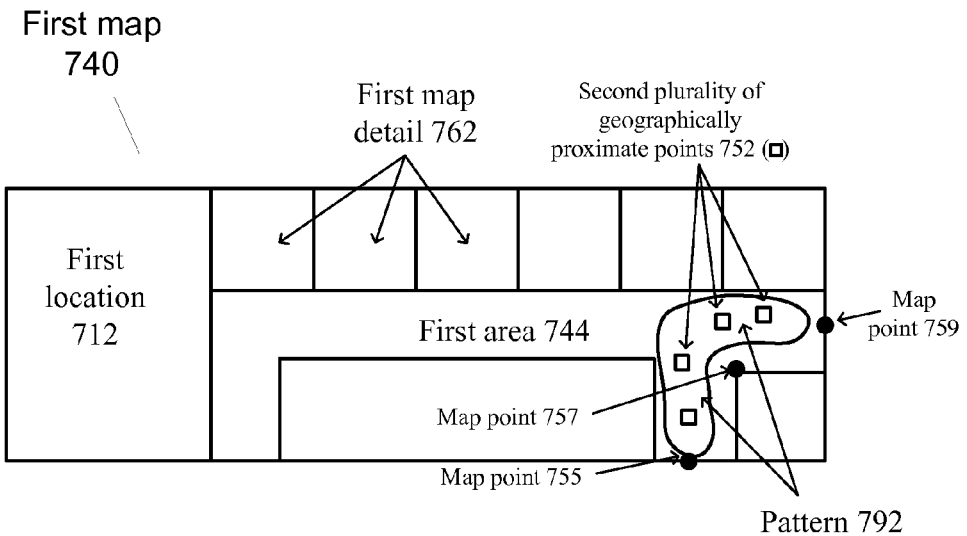
FIG. 7A illustrates a map according to one potential embodiment.
Figure 7B:
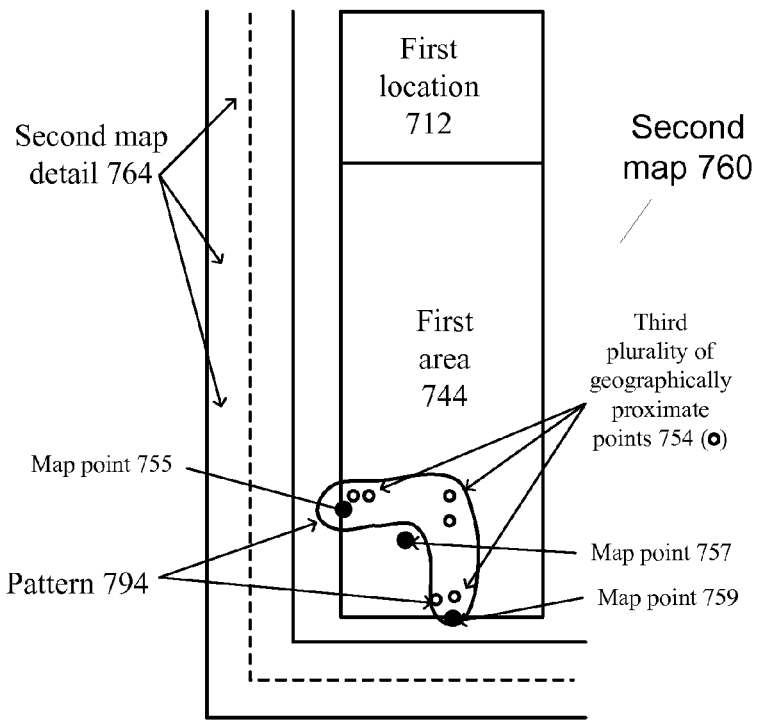
FIG. 7B illustrates a map according to one potential embodiment.

FIGS. 7A and 7B describes another alternative embodiment where crowdsourced points which may be measured by many different devices may be used to merge maps. FIG. 7A again includes first map 740, with first location 712, first map detail 762, and first area 744. In first map 740, the second plurality of geographically proximate points 752 are at least partially within first area 744. The second plurality of geographically proximate points 752 may be crowdsourced points that include many different measurements from many different mobile devices. This may include trajectory information, or may merely include individual location measurements. While four points are shown in FIG. 7A, the second plurality of geographically proximate points 752 may include sufficient information to accurately enable recognition of pattern 792 which may correspond to walking paths where mobile devices may be located. Pattern 792 as shown in FIG. 7A may represent a hallway in first area 744 between a door at map point 755 and a door at map point 759, with walls creating a corner at map point 757.

While first map detail 762 may include information related to walls that create the corner at map point 757, these walls are not included in the map detail of second map 760. With sufficient crowdsourced information, however, the presence of the walls and a roughly approximate location of the corner at map point 757 may be inferred from crowdsourced measurements. This may be true even if the data used to identify the map point 757 in second map 760 is different than the data used for the first map 740. Further, in certain embodiments, the map points need not be identified at all, but the pattern of the map points may be matched. Thus, a system may analyze the third plurality of geographically proximate points 754 to identify pattern 794. The system may then recognize that pattern 794 matches pattern 792. These two patterns 792 and 794 may then be oriented and scaled to roughly match each other. Additional information such as first location 712 may be used to support such a match, either with fine tuning the orientation and scaling to match a map point, wall, or other marker associated with first location 712, or as a check to verify that first location is roughly merged to a same general location is the merged map. Other checks may further be used as confirmation, such as checking that road details from second map detail 764 is aligned as expected, and does not appear to intersect with a building in an unexpected location.

In alternate embodiments, rather than aligning a pattern of crowdsourced points, the crowdsourced points may be used first to identify map points in maps to be merged. For example, in first map 740 and second map 760, at least three map points 755, 757, and 759 may be identified in both maps from the crowdsourced pluralities of geographically proximate points 752 and 754. Once the map points are identified, in each map, the map points may be oriented and scaled to match the coordinate systems of the maps, and the maps may then be merged. Just as above, checks using other information may verify that the map points have been correctly identified, and provide sufficient accuracy to merge the maps in a way that provides useful merged map information.

Figure 8:
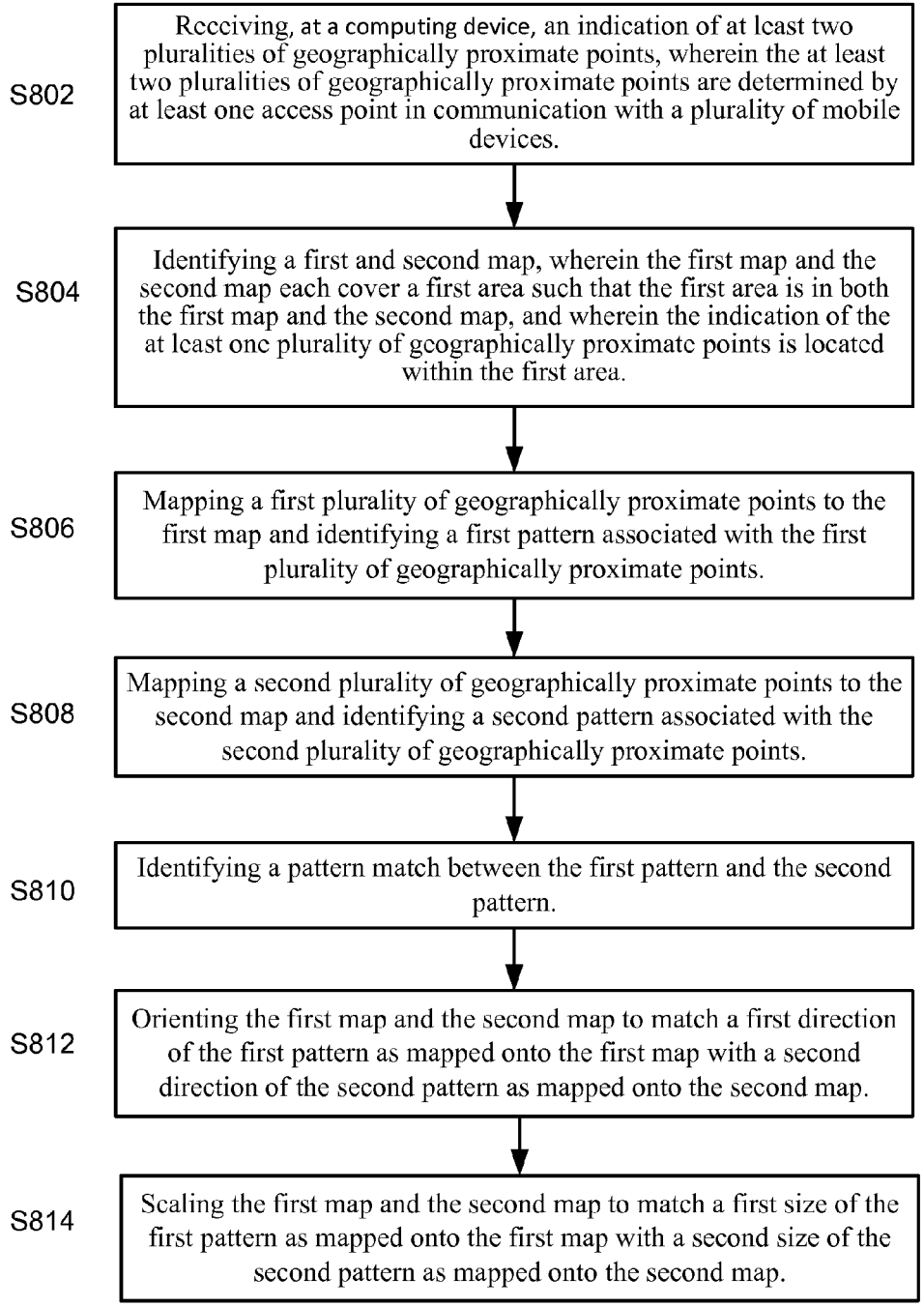
FIG. 8 illustrates a method according to one potential embodiment.

FIG. 8 then describes another method of merging maps. S802 involves receiving, at a computing device, an indication of at least two pluralities of geographically proximate points, wherein the at least two pluralities of geographically proximate points are determined by at least one access point in communication with a plurality of mobile devices. S804 involves identifying a first and second map, wherein the first map and the second map each cover a first area such that the first area is in both the first map and the second map, and wherein the indication of the at least one plurality of geographically proximate points is located within the first area.

S806 involves mapping a first plurality of geographically proximate points to the first map and identifying a first pattern associated with the first plurality of geographically proximate points. This pattern may be such that it identifies map points associated with physical obstructions that create the pattern, or may simply be an identification of the pattern created by the indications of the points. S508 similarly involves mapping a second plurality of geographically proximate points to the second map and identifying a second pattern associated with the second plurality of geographically proximate points.

In S810, a pattern match is identified between the first pattern and the second pattern. Similar to what is described above, this match may involve a match between map points identified as part of the pattern for each map. Then, once such a match is identified using the pluralities of geographically proximate points, in S812 and S814 the transformation is performed to match the maps. S812 involves orienting the first map and the second map to match a first direction of the first pattern as mapped onto the first map with a second direction of the second pattern as mapped onto the second map. S814 involves scaling the first map and the second map to match a first size of the first pattern as mapped onto the first map with a second size of the second pattern as mapped onto the second map. After the maps are set to the same coordinate system by the orientation and scaling of S812 and S814, the details of the maps may be merged into a single merged map.

Figure 9:
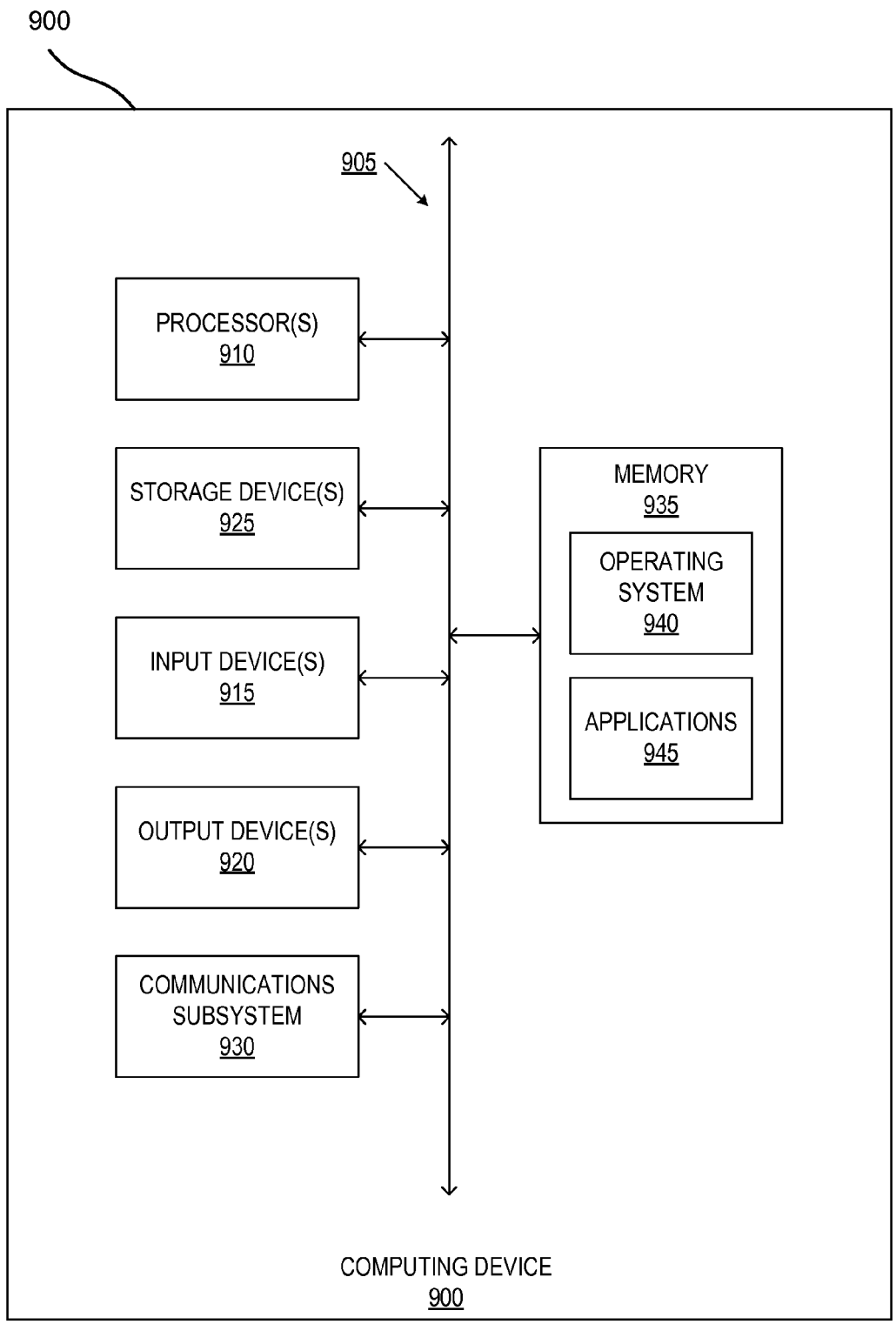
FIG. 9 is one potential implementation of a computer device according to certain embodiments.

FIG. 9 illustrates an example of a computing system in which one or more embodiments may be implemented. A computer system as illustrated in FIG. 9 may be incorporated as part of the previously described computerized devices in FIGS. 1 and 4. For example, various embodiments of mobile devices 102, 104, and 106, as well as embodiments of access point 110, crowdsourcing server computer 120, map merge computer 130, map provider computer 132, and map provider computer 134 may be implemented as a computing device 900. Additionally, any computing device as described herein may include any combination of components. For example, any of mobile device 400, access point 110, or map merge computer 130 may be structured according to the embodiment of computing device 900 of FIG. 9 or any element of computing device 900 in combination with other elements. In various embodiments then, elements or components of a system may be structured as any functional mix of computing elements described herein, such that any function or functions of any device described herein may be implemented by multiple computing devices similar to computing device 900, or any combination of elements of computing device 900.

FIG. 9 provides a schematic illustration of one embodiment of a computing device 900 that can perform the methods provided by various other embodiments such as the embodiments described by FIGS. 4, 6, and 8 as described herein. FIG. 9 is meant only to provide a generalized illustration of various components, any or all of which may be utilized as appropriate. FIG. 9, therefore, broadly illustrates how individual system elements may be implemented in a relatively separated or relatively more integrated manner, and describes elements that may implement specific methods according to embodiments of the invention when, for example, controlled by computer readable instructions from a non-transitory computer readable storage device such as storage devices 925.

The computing device 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like. These elements may be used to display, transform, scale, and orient indications of points that used to merge maps as described herein using processors 910 to perform the calculates that are part of such transformations and merges of map data into merged maps.

The computing device 900 may further include (and/or be in communication with) one or more non-transitory storage devices 925, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like. The particular instructions which may define a specific embodiment of map transformation and merging may thus be stored in such non-transitory storage devices and used by one or more processors 910 to cause a computing device 900 to perform a map merge.

The computing device 900 might also include a communications subsystem 930, which can include without limitation a modem, a network card (wireless or wired), an infrared communication device, a wireless communication device and/or chipset (such as a Bluetooth® device, a 702.11 device, a Wi-Fi device, a WiMax device, cellular communication facilities, etc.), and/or similar communication interfaces. The communications subsystem 930 may permit data to be exchanged with a network (such as the network described below, to name one example), other computer systems, and/or any other devices described herein. A mobile device such as mobile device 400 may thus include other communication subsystems in addition to those including wireless transceiver 412 and LAN wireless transceiver 442. These systems may be used to communicate indications of geographically proximate points such as those in the pluralities of geographically proximate points 550, 552, and 554 described herein.

In many embodiments, the computing device 900 will further comprise a non-transitory working memory 935, which can include a RAM or ROM device, as described above. The computing device 900 also can comprise software elements, shown as being currently located within the working memory 935, including an operating system 940, device drivers, executable libraries, and/or other code, such as one or more applications 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods for merging maps.

A set of these instructions and/or code might be stored on a computer-readable storage medium, such as the storage device(s) 925 described above. In some cases, the storage medium might be incorporated within a computer system, such as computing device 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computing device 900 and/or might take the form of source and/or installable code, which, upon compilation and/or installation on the computing device 900 (e.g., using any of a variety of generally available compilers, installation programs, compression/decompression utilities, etc.) then takes the form of executable code. Map merge application module 421 may thus be executable code as described herein.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, controls for sensors such as cameras, accelerometers, magnetometers, gyroscopes, or other such modules may be implemented as hardware, software, or firmware within a computing device 900. An activity selection subsystem configured to provide some or all of the features described herein relating to the selection of activities by whereby a user may manually select map merges or may configure settings for automatic merging of maps, and such subsystems comprise hardware and/or software that is specialized (e.g., an application-specific integrated circuit (ASIC), a software method, etc.) or generic (e.g., processor(s) 719100, applications 945 which may for example, implement any module within memory 420, etc.) Further, connection to other computing devices such as network input/output devices may be employed.

The terms "machine-readable medium" and "computer-readable medium," as used herein, refer to any medium that participates in providing data that causes a machine to operate in a specific fashion. In an embodiment implemented using the computing device 900, various computer-readable media might be involved in providing instructions/code to processor(s) 910 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 925. Volatile media include, without limitation, dynamic memory, such as the working memory 935. Transmission media include, without limitation, coaxial cables, copper wire and fiber optics, including the wires that comprise the bus 905, as well as the various components of the communications subsystem 930 (and/or the media by which the communications subsystem 930 provides communication with other devices).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code. Any such memory may function as memory 420 or as secure memory if structured to maintain security of stored content.

The communications subsystem 930 (and/or components thereof) generally will receive the signals, and the bus 905 then might carry the signals (and/or the data, instructions, etc. carried by the signals) to the working memory 935, from which the processor(s) 910 retrieves and executes the instructions. The instructions received by the working memory 935 may optionally be stored on a non-transitory storage device 925 either before or after execution by the processor(s) 910.

In various embodiments as described herein, computing devices may be networked in order to communicate information. For example, any of mobile devices 102, 104, and 106, access point 110, crowdsourcing server computer 120, map merge computer 130, map provider computer 132, or map provider computer 134 may communicate information such as indications of geographically proximate points with any other element. Additionally, each of these elements may engage in networked communications with other devices such as web servers, databases, or computers which provide access to information to enable applications via network.

Figure 10:
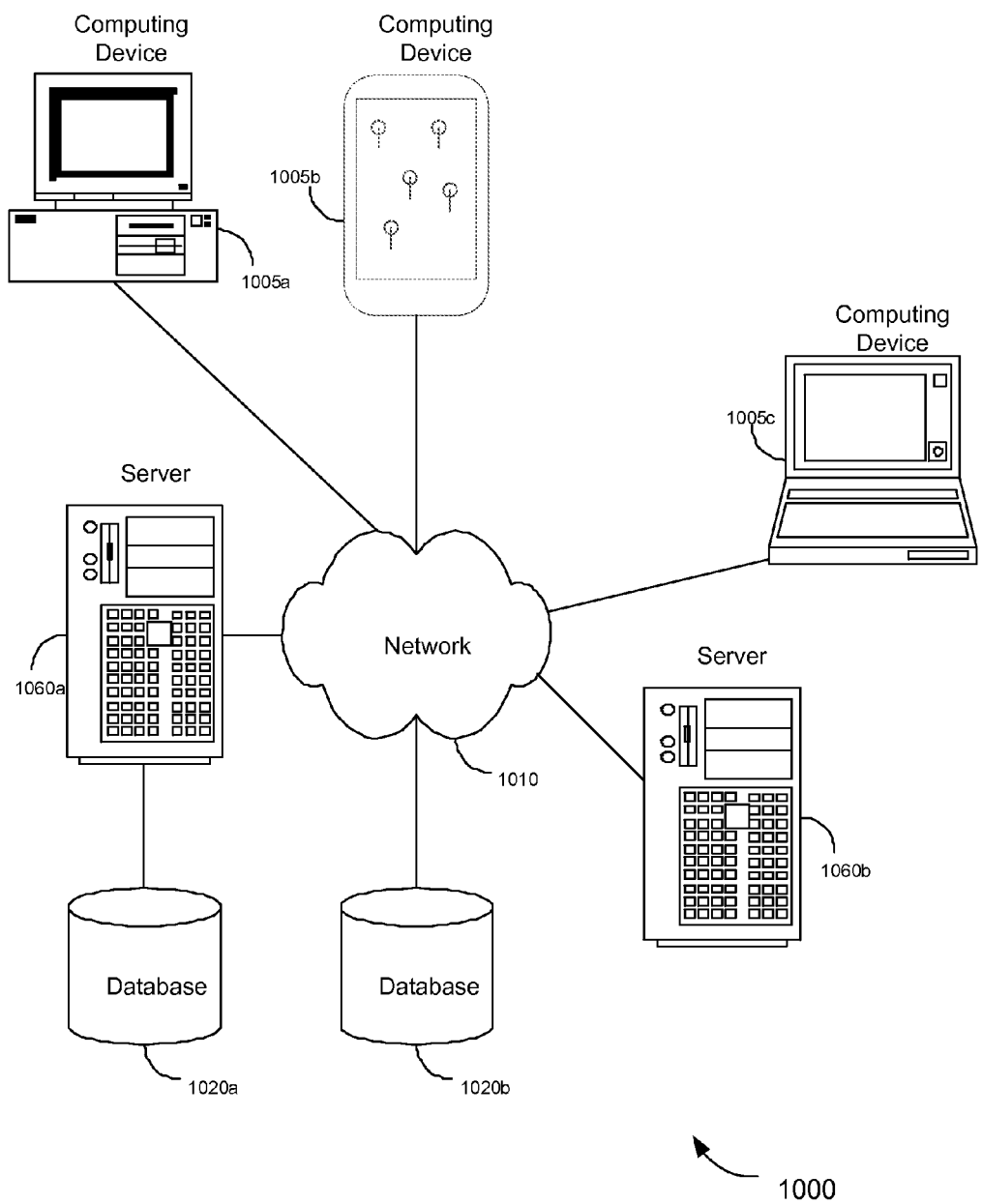
FIG. 10 is one potential implementation of a networked computer system according to certain embodiments.

FIG. 10 illustrates a schematic diagram of a system 1000 of networked computing devices that can be used in accordance with various embodiments to enable systems such as system 1000 or other systems that may implement map merging. The system 1000 can include one or more user computing devices 1005. The user computing devices 1005 can be general purpose personal computers (including, merely by way of example, personal computers and/or laptop computers running any appropriate flavor of Microsoft Corp.'s Windows® and/or Apple Corp.'s Macintosh® operating systems) and/or workstation computers running any of a variety of commercially-available UNIX™ or UNIX-like operating systems. These user computing devices 1005 can also have any of a variety of applications, including one or more applications configured to perform methods of the invention, as well as one or more office applications, database client and/or server applications, and web browser applications. Alternatively, the user computing devices 1005 can be any other electronic device, such as a thin-client computer, Internet-enabled mobile telephone, and/or personal digital assistant (PDA), capable of communicating via a network (e.g., the network 1010 described below) and/or of displaying and navigating web pages or other types of electronic documents. Although the exemplary system 1000 is shown with three user computing devices 1005, any number of user computing devices can be supported.

Certain embodiments of the invention operate in a networked environment, which can include a network 1010. The network 1010 can be any type of network familiar to those skilled in the art that can support data communications using any of a variety of commercially-available protocols, including, without limitation, TCP/IP, SNA, IPX, AppleTalk, and the like. Merely by way of example, the network 810 can be a local area network ("LAN"), including, without limitation, an Ethernet network, a Token-Ring network and/or the like; a wide-area network (WAN); a virtual network, including, without limitation, a virtual private network ("VPN"); the Internet; an intranet; an extranet; a public switched telephone network ("PSTN"); an infrared network; a wireless network, including, without limitation, a network operating under any of the IEEE 802.11 suite of protocols, the Bluetooth® protocol known in the art, and/or any other wireless protocol; and/or any combination of these and/or other networks. Network 1010 may include access points such as access point 110 for enabling access to network 1010 by various computing devices.

Embodiments of the invention can include one or more server computers 860. Each of the server computers 1060 may be configured with an operating system, including, without limitation, any of those discussed above, as well as any commercially (or freely) available server operating systems. Each of the server computers 1060 may also be running one or more applications, which can be configured to provide services to one or more user computing devices 1005 and/or other server computers 860. For examples, in one potential embodiments, server 1060*a* may run a first map application that provides a first map to mobile device 400 and server 1060*b* may run a second application that provides a second map to mobile device 300. Alternatively, server 1060*a* may run a map merge computer 130 that receives indications of geographically proximate points as well as a first map and a second map from a combination of database 1020*a* and networked database 1020*b* which is coupled to server 1060*a* via network 1010.

Merely by way of example, one of the server computers 1060 may be a web server, which can be used, merely by way of example, to process requests for web pages or other electronic documents from user computing devices 1005. The web server can also run a variety of server applications, including HTTP servers, FTP servers, CGI servers, database servers, Java® servers, and the like. In some embodiments of the invention, the web server may be configured to serve web pages that can be operated within a web browser on one or more of the user computing devices 1005 to perform methods of the invention. Such servers may be associated with particular IP addresses, or may be associated with modules having a particular URL, and may thus store secure navigation modules which may interact with a mobile device such as mobile device 400 to provide secure indications of geographic points as part of location services provided to mobile device 400.

In accordance with further embodiments, one or more server computers 1060 can function as a file server and/or can include one or more of the files (e.g., application code, data files, etc.) necessary to implement methods of various embodiments incorporated by an application running on a user computing device 1005 and/or another server computer 1060. Alternatively, as those skilled in the art will appreciate, a file server can include all necessary files, allowing such an application to be invoked remotely by a user computing device 1005 and/or server computer 1060. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 1020. The location of the database(s) 1020 is discretionary: merely by way of example, a database 1020a might reside on a storage medium local to (and/or resident in) a server 1060a (and/or a user computing device 1005). Alternatively, a database 1020b can be remote from any or all of the user computing devices 1005 or server computers 1060, so long as the database 1020b can be in communication (e.g., via the network 1010) with one or more of these. In a particular set of embodiments, a database 1020 can reside in a storage-area network ("SAN") familiar to those skilled in the art. (Likewise, any necessary files for performing the functions attributed to the user computing devices 1005 or server computers 1060 can be stored locally on the respective computer and/or remotely, as appropriate.) In one set of embodiments, the database 1020 can be a relational database, such as an Oracle® database, that is adapted to store, update, and retrieve data in response to SQL-formatted commands. The database might be controlled and/or maintained by a database server, as described above, for example. Such databases may store information relevant to levels of security, which users may access certain levels of security, which map details may be included in certain maps of a security level, or any other such details which may be used as part of location assistance or location access data. Location data which may be sensitive, such as indications of points associated with a particular mobile device may have associated security, while crowd-sourced data which includes indications of pluralities of points which cannot be associated with a particular device may have lower security levels.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner.

Specific details are given in the description to provide a thorough understanding of the embodiments. However, embodiments may be practiced without certain specific details. For example, well-known circuits, processes, algorithms, structures, and techniques have been mentioned without unnecessary detail in order to avoid obscuring the embodiments. This description provides example embodiments only, and is not intended to limit the scope, applicability, or configuration of various embodiments. Rather, the preceding description of the embodiments will provide those skilled in the art with an enabling description for implementing embodiments. Various changes may be made in the function and arrangement of elements without departing from the spirit and scope of various embodiments.

Also, some embodiments were described as processes depicted in a flow with process arrows. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Additionally, the above elements may merely be a component of a larger system, wherein other rules may take precedence over or otherwise modify the application various embodiments, and any number of steps may be undertaken before, during, or after the elements of any embodiment are implemented.

Having described several embodiments, it will therefore be clear to a person of ordinary skill that various modifications, alternative constructions, and equivalents may be used without departing from the spirit of the disclosure.

What is claimed is:

1. A method of combining maps comprising:
    receiving, at a computing device, an indication of at least one plurality of geographically proximate points, wherein each of the at least one plurality of geographically proximate points are determined by at least one access point in communication with one or more mobile devices;
    receiving a first map;
    receiving a second map, wherein the first map and the second map each cover a first area such that the first area is in both the first map and the second map, and wherein the indication of the at least one plurality of geographically proximate points is located within the first area;
    mapping at least a first portion of the indication of the at least one plurality of geographically proximate points on the first map;
    mapping at least a second portion of the indication of the at least one plurality of geographically proximate points on the second map; and
    merging the first map and the second map by matching the mapping of the first portion of the indication of the at least one plurality of geographically proximate points on the first map and the second portion of the indication of the at least one plurality of geographically proximate points on the second map.

2. The method of claim 1, wherein the first portion and the second portion of the indication of the at least one plurality of geographically proximate points comprises at least one vector.

3. The method of claim 2 wherein mapping at least the first portion of the indication of the at least one plurality of geographically proximate points on the first map comprises mapping the at least one vector on the first map;
    wherein mapping at least the second portion of the indication of the at least one plurality of geographically proximate points on the second map comprises mapping the at least one vector on the second map; and
    wherein merging the first map and the second map by matching the mapping of the first portion of the indication of the at least one plurality of geographically proximate points on the first map and the second portion of the indication of the at least one plurality of geographically proximate points on the second map comprises:

orienting the first map to match a first direction of the at least one vector as mapped on the first map to a second direction of the at least one vector as mapped on the second map; and scaling the first map to match a first magnitude of the at least one vector as mapped on the first map to match a second magnitude of the at least one vector as mapped on the second map.

4. The method of claim 2, wherein the at least one vector is derived from one of the at least one plurality of geographically proximate points.

5. The method of claim 4, wherein the at least one plurality of geographically proximate points are recorded at contiguous times.

6. The method of claim 1, wherein the indication of the at least one plurality of geographically proximate points is based upon information received from a plurality of mobile devices.

7. The method of claim 6, wherein the indication of the at least one plurality of geographically proximate points comprises an exit.

8. The method of claim 6, wherein the indication of at least one plurality of geographically proximate points comprises an indication of at least three pluralities of geographically proximate points.

9. The method of claim 6 wherein the first portion of the indication of the at least one plurality of geographically proximate points comprises a first plurality of geographically proximate points, wherein the second portion of the indication of the at least one plurality of geographically proximate points comprises a second plurality of geographically proximate points, and wherein the first plurality and the second plurality of geographically proximate points are mutually exclusive portions of the indication of the at least one plurality of geographically proximate points.

10. The method of claim 9 wherein the first plurality of geographically proximate points is based upon information from a first plurality of mobile devices and wherein the second plurality of geographically proximate points is based upon information from a second plurality of mobile devices that is different from the first plurality of mobile devices.

11. The method of claim 10, wherein merging the first map and the second map by matching the mapping of the first portion of the indication of the at least one plurality of geographically proximate points on the first map and the second portion of the indication of the at least one plurality of geographically proximate points on the second map comprises:

identifying a first pattern associated with the first plurality of geographically proximate points;

identifying a second pattern associated with the second plurality of geographically proximate points;

identifying a pattern match between the first pattern and the second pattern;

orienting the first map and the second map to match a first direction of the first pattern as mapped onto the first map with a second direction of the second pattern as mapped onto the second map; and scaling the first map and the second map to match a first size of the first pattern as mapped onto the first map with a second size of the second pattern as mapped onto the second map.

12. The method of claim 11 wherein identifying the first pattern associated with the first plurality of geographically proximate points comprises identifying at least a first map point, a second map point, and a third map point from the first plurality of geographically proximate points; and wherein identifying the second pattern associated with the second plurality of geographically proximate points comprises identifying at least the first map point, the second map point, and the third map point from the second plurality of geographically proximate points.

13. The method of claim 11 wherein the first pattern is associated with a turn.

14. The method of claim 1 wherein receiving the indication of the at least one plurality of geographically proximate points comprises receiving, from a crowdsourcing server computer, at least two map points derived from the at least one plurality of geographically proximate points, wherein the crowdsourcing server computer derives the at least two map points from information received from a plurality of mobile devices via the at least one access point.

15. The method of claim 1 wherein receiving the indication of the at least one plurality of geographically proximate points comprises receiving, from a crowdsourcing server computer, at least one vector derived from the at least one plurality of geographically proximate points, wherein the crowdsourcing server computer derives the at least one vector from information received from a plurality of mobile devices via the at least one access point.

16. A computing device comprising:

a wireless transceiver;

a memory coupled to the wireless transceiver, the memory comprising a first map and a second map wherein the first map and the second map each cover a first area such that the first area is in the first map and the second map, and wherein the indication of the at least one plurality of geographically proximate points is located within the first area; and a processor coupled to the memory and the wireless transceiver;

wherein the wireless transceiver is configured to receive, an indication of at least one plurality of geographically proximate points, wherein each of the at least one plurality of geographically proximate points are determined by at least one access point; and wherein the processor is configured to:

map at least a first portion of the indication of the at least one plurality of geographically proximate points on the first map;

map at least a second portion of the indication of the at least one plurality of geographically proximate points on the second map; and merge the first map and the second map to create a merged map by matching the mapping of the first portion of the indication of the at least one plurality of geographically proximate points on the first map and the second portion of the indication of the at least one plurality of geographically proximate points on the second map.

17. The computing device of claim 16 further comprising:

a location module coupled to the processor that is configured to determine a current location of the computing device; and an output display coupled to the processor, wherein the output display is configured to receive the merged map from the processor and presents the merged map via the output display along with the current location of the computing device.

18. The computing device of claim 17 wherein the computing device is a mobile phone; and wherein the processor is configured to determine at least one plurality of geographically proximate points using the location module of the mobile phone.

19. The computing device of claim 16 wherein the first portion and the second portion of the indication of the at least one plurality of geographically proximate points comprises at least one vector.

20. The computing device of claim 19 wherein the processor is further configured to:
   map the at least one vector on the first map when the processor maps at least the first portion of the indication of the at least one plurality of geographically proximate points on the first map;
   map the at least one vector on the second map when the processor maps at least the second portion of the indication of the at least one plurality of geographically proximate points on the second map; and
   orient the first map to match a first direction of the at least one vector as mapped on the first map to a second direction of the at least one vector as mapped on the second map, and scales the first map to match a first magnitude of the at least one vector as mapped on the first map to match a second magnitude of the at least one vector as mapped on the second map when the processor merges the first map and the second map to create the merged map.

21. A computing device comprising:
   means for receiving an indication of at least one plurality of geographically proximate points, wherein each of the at least one plurality of geographically proximate points are determined by at least one access point in communication with one or more mobile devices;
   means for receiving a first map;
   means for receiving a second map, wherein the first map and the second map each cover a first area such that the first area is in the first map and the second map, and wherein the indication of the at least one plurality of geographically proximate points is located within the first area;
   means for mapping at least a first portion of the indication of the at least one plurality of geographically proximate points on the first map;
   means for mapping at least a second portion of the indication of the at least one plurality of geographically proximate points on the second map; and
   means for merging the first map and the second map by matching the mapping of the first portion of the indication of the at least one plurality of geographically proximate points on the first map and the second portion of the indication of the at least one plurality of geographically proximate points on the second map.

22. The computing device of claim 21, wherein the first portion and the second portion of the indication of the at least one plurality of geographically proximate points comprises at least one vector; and
   wherein the means for merging the first map and the second map comprises means for rotating and scaling the first map to match the at least one vector as mapped to the first map with the at least one vector as mapped to the second map.

23. The computing device of claim 21, wherein the indication of the at least one plurality of geographically proximate points is based upon information received from at least three mobile devices; and
   wherein the information received from each mobile device of the at least three mobile devices comprises at least one vector within the first area.

24. The computing device of claim 21 wherein the indication of the at least one plurality of geographically proximate points is based upon information received from a plurality of mobile devices.

25. The computing device of claim 24 wherein the first portion of the indication of the at least one plurality of geographically proximate points comprises a first plurality of geographically proximate points, wherein the second portion of the indication of the at least one plurality of geographically proximate points comprises a second plurality of geographically proximate points, and wherein the first plurality and the second plurality of geographically proximate points are mutually exclusive portions of the indication of the at least one plurality of geographically proximate points.

26. The computing device of claim 25 wherein the means for merging the first map and the second map by matching the mapping of the first portion of the indication of the at least one plurality of geographically proximate points on the first map and the second portion of the indication of the at least one plurality of geographically proximate points on the second map comprises:
   means for identifying a first pattern associated with the first plurality of geographically proximate points;
   means for identifying a second pattern associated with the second plurality of geographically proximate points;
   means for identifying a pattern match between the first pattern and the second pattern;
   means for orienting the first map and the second map to match a first direction of the first pattern as mapped onto the first map with a second direction of the second pattern as mapped onto the second map; and
   means for scaling the first map and the second map to match a first size of the first pattern as mapped onto the first map with a second size of the second pattern as mapped onto the second map.

27. A non-transitory computer readable storage medium comprising computer readable instructions that, when executed by a processor coupled to the storage medium cause a device to:
   receive an indication of at least one plurality of geographically proximate points, wherein each of the at least one plurality of geographically proximate points are determined by at least one access point in communication with one or more mobile devices;
   receive a first map;
   receive a second map, wherein the first map and the second map each cover a first area such that the first area is in the first map and the second map, and wherein the indication of the at least one plurality of geographically proximate points is located within the first area;
   map at least a first portion of the indication of the at least one plurality of geographically proximate points on the first map;
   map at least a second portion of the indication of the at least one plurality of geographically proximate points on the second map; and
   merge the first map and the second map by matching the mapping of the first portion of the indication of the at least one plurality of geographically proximate points on the first map and the second portion of the indication of the at least one plurality of geographically proximate points on the second map.

28. The non-transitory computer readable storage medium of claim 27 wherein mapping at least the first portion of the indication of the at least one plurality of geographically proximate points on the first map comprises causing the device to:

determine a location of the at least one access point within a first coordinate system of the first map;

determine a location of the at least one plurality of geographically proximate points with respect to the at least one access point; and determine the location of the at least one plurality of geographically proximate points within the first coordinate system of the first map using the location of the location of the at least one plurality of geographically proximate points with respect to the at least one access point.

29. The non-transitory computer readable storage medium of claim 27 wherein mapping at least the first portion of the indication of the at least one plurality of geographically proximate points on the first map comprises causing the device to:

select the at least one plurality of geographically proximate points on the first map from multiple pluralities of geographically proximate points based on a pattern associated with the at least one plurality of geographically proximate points;

wherein the merging the first map and the second map is performed using the pattern associated with the at least one plurality of geographically proximate points.

30. The non-transitory computer readable storage medium of claim 27 wherein the first portion and the second portion of the indication of the at least one plurality of geographically proximate points comprises at least one vector.

31. The non-transitory computer readable storage medium of claim 30 wherein the instructions, when executed by the processor coupled to the storage medium further cause the device to:

map the at least one vector on the first map when the device maps at least the first portion of the indication of the at least one plurality of geographically proximate points on the first map;

map the at least one vector on the second map when the device maps at least the second portion of the indication of the at least one plurality of geographically proximate points on the second map; and orient the first map to match a first direction of the at least one vector as mapped on the first map to a second direction of the at least one vector as mapped on the second map, and scale the first map to match a first magnitude of the at least one vector as mapped on the first map to match a second magnitude of the at least one vector as mapped on the second map when the device merges the first map and the second map to create a merged map.

* * * * *